(12) United States Patent
Shaffer et al.

(10) Patent No.: US 11,600,919 B2
(45) Date of Patent: Mar. 7, 2023

(54) PRECISION AIMING OF AN ANTENNA BASED ON A RADIO SOURCE

(71) Applicant: Higher Ground LLC, Palo Alto, CA (US)

(72) Inventors: Shmuel Shaffer, Palo Alto, CA (US); Darren Robert Reis, Palo Alto, CA (US); James M. Behmke, Boston, MA (US)

(73) Assignee: Higher Ground LLC, Palo Alto, CA (US)

( * ) Notice: Subject to any disclaimer, the term of this patent is extended or adjusted under 35 U.S.C. 154(b) by 158 days.

(21) Appl. No.: 17/217,225

(22) Filed: Mar. 30, 2021

(65) Prior Publication Data

US 2021/0313678 A1    Oct. 7, 2021

Related U.S. Application Data

(60) Provisional application No. 63/004,033, filed on Apr. 2, 2020.

(51) Int. Cl.
| | | |
|---|---|---|
| *H04B 1/00* | (2006.01) | |
| *H01Q 3/08* | (2006.01) | |
| *H04B 7/185* | (2006.01) | |
| *H04B 7/08* | (2006.01) | |
| *H04B 17/318* | (2015.01) | |

(52) U.S. Cl.
CPC ............... *H01Q 3/08* (2013.01); *H04B 7/08* (2013.01); *H04B 7/1851* (2013.01); *H04B 17/318* (2015.01)

(58) Field of Classification Search
CPC .. H01Q 3/04; H01Q 3/08; H01Q 3/12; H01Q 3/22; H04B 7/08; H04B 7/0817; H04B 7/1851; H04B 17/318; H04B 7/02
See application file for complete search history.

(56) References Cited

U.S. PATENT DOCUMENTS

| | | |
|---|---|---|
| 8,072,917 B2 | 12/2011 | Wu et al. |
| 9,585,106 B2 | 2/2017 | Yang et al. |
| 9,713,019 B2 | 7/2017 | Negus et al. |
| 10,009,910 B2 | 6/2018 | Reis et al. |
| 10,644,377 B2 * | 5/2020 | Olsson ............... H01Q 17/001 |
| 10,763,954 B2 * | 9/2020 | Gaske ............... H04B 7/18508 |
| 2016/0141744 A1 * | 5/2016 | Smith ............... H01Q 1/1257 342/359 |

* cited by examiner

*Primary Examiner* — Tuan Pham
(74) *Attorney, Agent, or Firm* — Behmke Innovation Group LLC; James M. Behmke; Jonathon P. Western

(57) ABSTRACT

In one embodiment, a method comprises: receiving a signal from a remote antenna at first and second antennas, the first and second antenna being collocated and offset from one another by a fixed predetermined angle such that a center of a high gain region of a main lobe of the first antenna is substantially aligned with a low gain region of a main lobe of the second antenna; determining a set of characteristics of the signal based on the signal being received at the first antenna; decoding a first data set based on the signal being received at the first antenna and a second data set based on the signal being received at the second antenna, both using the set of signal characteristics; and determining a currently aimed direction of the first antenna with relation to the remote antenna based on the difference between the first and second data sets.

26 Claims, 19 Drawing Sheets

PRECISION AIMING OF AN ANTENNA BASED ON A RADIO SOURCE

RELATED APPLICATION

This application claims the benefit of, and priority to, U.S. Provisional Application No. 63/004,033, filed Apr. 2, 2020, entitled DIRECTING AN ANTENNA TOWARD A RADIO SOURCE, by Shaffer, et al., the contents of which are incorporated herein by reference.

TECHNICAL FIELD

The present disclosure relates generally to wireless communication systems, and, more particularly, to precision aiming of an antenna based on a radio source, such as a remote satellite antenna.

BACKGROUND

It is generally desired to point a transmitting device's directional antenna toward an intended receiver. For instance, the purpose of this aim is to ensure that a directional transmission lobe of the antenna provides the best receive power at the intended receiver. In certain situations, aiming the antenna may also have the benefit of creating the least amount of interferences at an unintended receiver.

Though in many instances, a "good enough" approach to antenna aiming is acceptable so long as the receiver can understand and decode the incoming signals, in some technology environments, precision antenna aiming is essential or even critical to operation. However, current antenna aiming techniques, particularly for low power, low cost devices, may have directional estimations or tolerances that do not meet the standards necessary for precise aiming, potentially creating unacceptable (or at least undesirable) signal transmissions.

SUMMARY

According to one or more of the embodiments herein, systems and techniques for accurately directing an antenna, such as a satellite antenna, based on a radio source are provided. In particular, a system in accordance with the techniques herein allows a low-power and small-aperture (and thus wide-lobed) device to point its transmission antenna (a "first antenna") precisely towards an intended direction (e.g., receiver, satellite, etc.) and/or away from an undesired direction, by using the first antenna and an independent secondary antenna positioned at a slightly different angle. In another example implementation, knowing the precise direction towards a satellite whose location is known can help determine the location of the device. By determining the percentage of properly detected symbols sent from the intended target remote device for each antenna, the techniques herein can precisely aim the first antenna. That is, determining that the receiver associated with the first antenna successfully detects a majority of symbols (e.g., close to 100%) while the receiver associated with the secondary antenna detects only lesser target percentage of successful symbols is indicative of the antenna of the intended target remote device being located at a precise location along an edge of the secondary antenna main lobe.

Specifically, in one embodiment, an example method comprises: receiving, by a device, a signal from a remote antenna at both a first antenna and a second antenna, the first antenna and the second antenna being collocated and offset from one another by a fixed predetermined angle such that a center of a high gain region of a main lobe of the first antenna is substantially aligned with a low gain region of a main lobe of the second antenna; determining, by the device, a set of characteristics of the signal based on the signal being received at the first antenna; decoding, by the device, a first data set based on the signal being received at the first antenna using the set of signal characteristics; decoding, by the device, a second data set based on the signal being received at the second antenna using the set of signal characteristics; calculating, by the device, a difference between the first data set and the second data set; and determining, by the device, a currently aimed direction of the first antenna with relation to the remote antenna based on the difference between the first data set and the second data set.

Other embodiments of the present disclosure may be discussed in the detailed description below, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Figure 1:
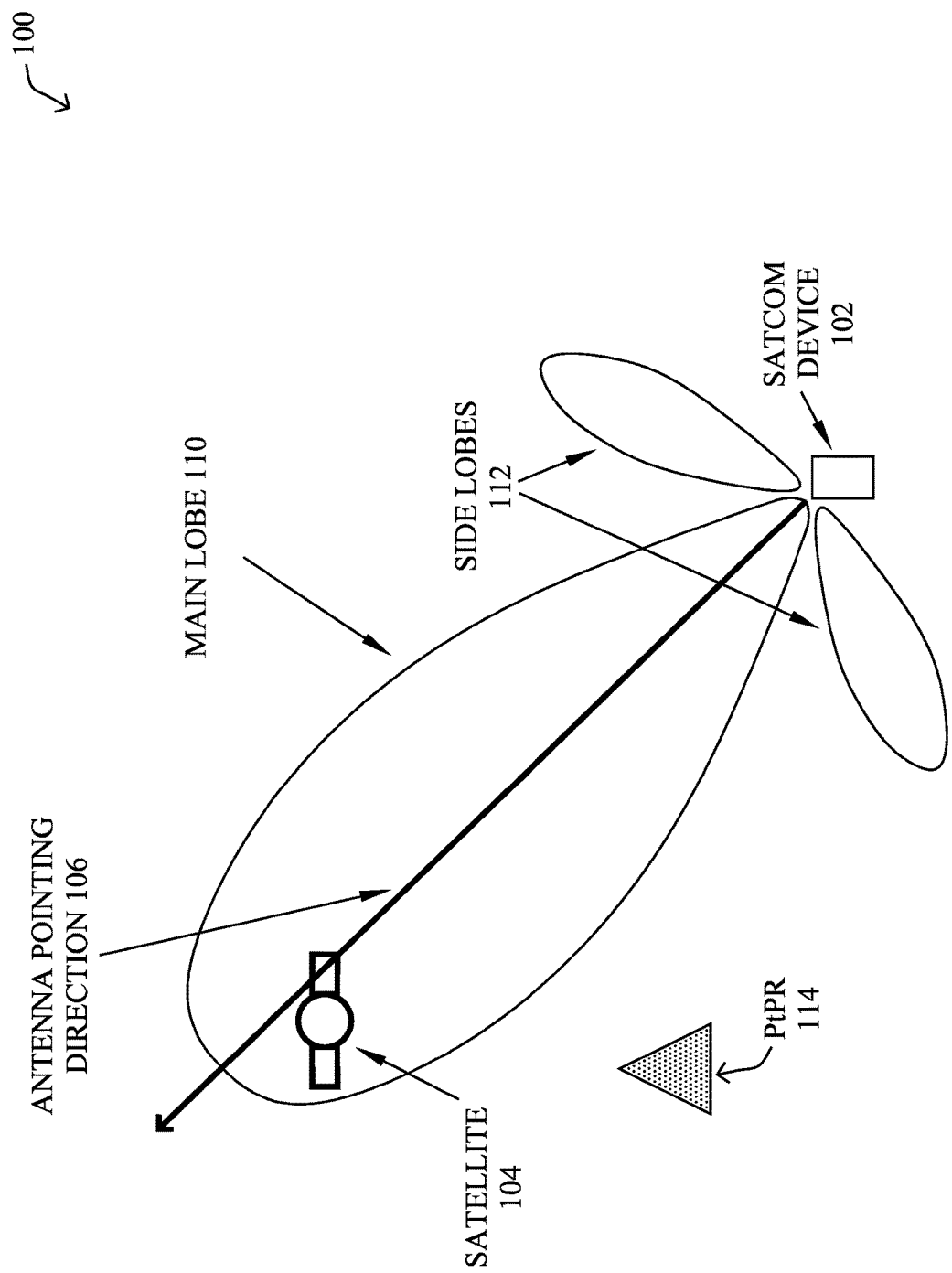
FIG. 1 illustrates an example communication system, for example, for satellite communication.

As noted above, pointing a transmitting device's directional antenna toward an intended receiver is a general practice to ensure that a directional transmission lobe of the antenna provides the best receive power at the intended receiver. As also noted above, what may be acceptable in some technology environments in terms of directional precision and tolerances may not be sufficient for systems where antenna aiming is essential or even critical to operation.

One such example environment is described in commonly owned U.S. Pat. No. 10,009,910 by Reis et al., entitled "Reduced Power for Avoidance of Interference in Wireless Communications", issued Jun. 26, 2018 to Higher Ground LLC of Palo Alto, Calif., the contents of which are incorporated herein in their entirety. In this example environment, in particular, a handheld mobile device (terminal) may be used to provide satellite communication, where the device reuses a frequency band that is utilized by high-priority incumbent point-to-point receivers (PtPRs). It is critical in this environment to ensure that the terminal never interferes with the operations of these incumbent PtPRs. In other words, the satellite communication device (terminal) should never transmit toward a PtPR from a location where the reception of the PtPR may be adversely affected by the transmission of the satellite communication device.

Accordingly, to avoid interference in the example above or in other high-precision embodiments, the antenna of a terminal needs to be pointed in a specific direction towards the satellite and away from the unintended receivers. In other still other environments, precise aiming of the antenna may be necessary for other reasons, such as better reception at the receiver, less likelihood of interception by eavesdropping devices, determining the location of the terminal, and so on.

As such, knowing the exact direction in which the antenna is pointing is an important and oftentimes crucial ability to have, yet one which is unavailable to many smaller or inexpensive directional antenna systems. For instance, using a compass associated with the terminal is a challenge because the compass may get out of alignment or provide a faulty/inaccurate reading, resulting in pointing the device's antenna in a direction other than expected, potentially towards an unintended receiver and causing interference. Also, using a received signal strength indication (RSSI) of a signal received from the intended receiver (e.g., a satellite, such as a geostationary orbit (GEO) satellite) to point the terminal's antenna directly towards the well-known direction of the satellite is challenging because the small aperture of the terminal's antenna results in a rather flat gain of the antenna in the direction in which it is pointed. Given the weak signal from the satellite, pointing the antenna away from the satellite and using the non-flat portion of the antenna gain curve reduces the power received by the terminal from the satellite resulting in an increased error rate and lower available bandwidth.

The techniques herein, therefore, provide for accurately directing an antenna, such as an antenna of a satellite communications device (e.g., and earth-bound device), toward a radio source such as a satellite antenna. In particular, the techniques herein allow a low-power and small-aperture device to point its transmission antenna (a "first antenna") precisely towards an intended direction (e.g., receiver, satellite, etc.) by using the first antenna main lobe and an independent secondary antenna main lobe positioned at a slightly different angle. (Notably, the fact that a device uses a small aperture antenna results in a wide lobe. While a wide antenna lobe may be acceptable for receiving functions, the wide lobe, and specifically the challenge of pointing the antenna in an exact direction, may cause interference issues when transmitting in the vicinity of an unintended high-priority receiver, as described in the above-referenced U.S. Pat. No. 10,009,910.) By determining the percentage of properly detected symbols sent from the target remote device, e.g., and decoded by the associated receiver for each antenna, the techniques herein can precisely aim the first antenna based on knowing where the receiver associated with the first antenna successfully detects a majority of symbols (e.g., close to 100%) while the receiver associated with the secondary antenna detects only lesser target percentage of successful symbols, indicative of the intended target remote device being located at a precise direction along an edge of the secondary antenna main lobe.

FIG. 1 illustrates an example of a communication environment 100, particularly showing terminal 102 (e.g., a "SatCom" device) in communication with a satellite 104. Assume that an antenna (e.g., a small aperture antenna) of the terminal 102 is pointing in a direction 106 substantially towards the satellite 104 and, therefore, the gain of the small aperture antenna is sufficient to accommodate the satellite communication, where the small aperture antenna's radiation pattern may comprise a main lobe 110 and respective side lobes 112, as will be described in greater detail below. Accordingly, the gain of the antenna towards an unintended receiver 114 (e.g., a PtPR as shown) is small enough as to prevent interference with the operations of the PtPR 114, while providing sufficient gain towards the intended target satellite.

Figure 2:
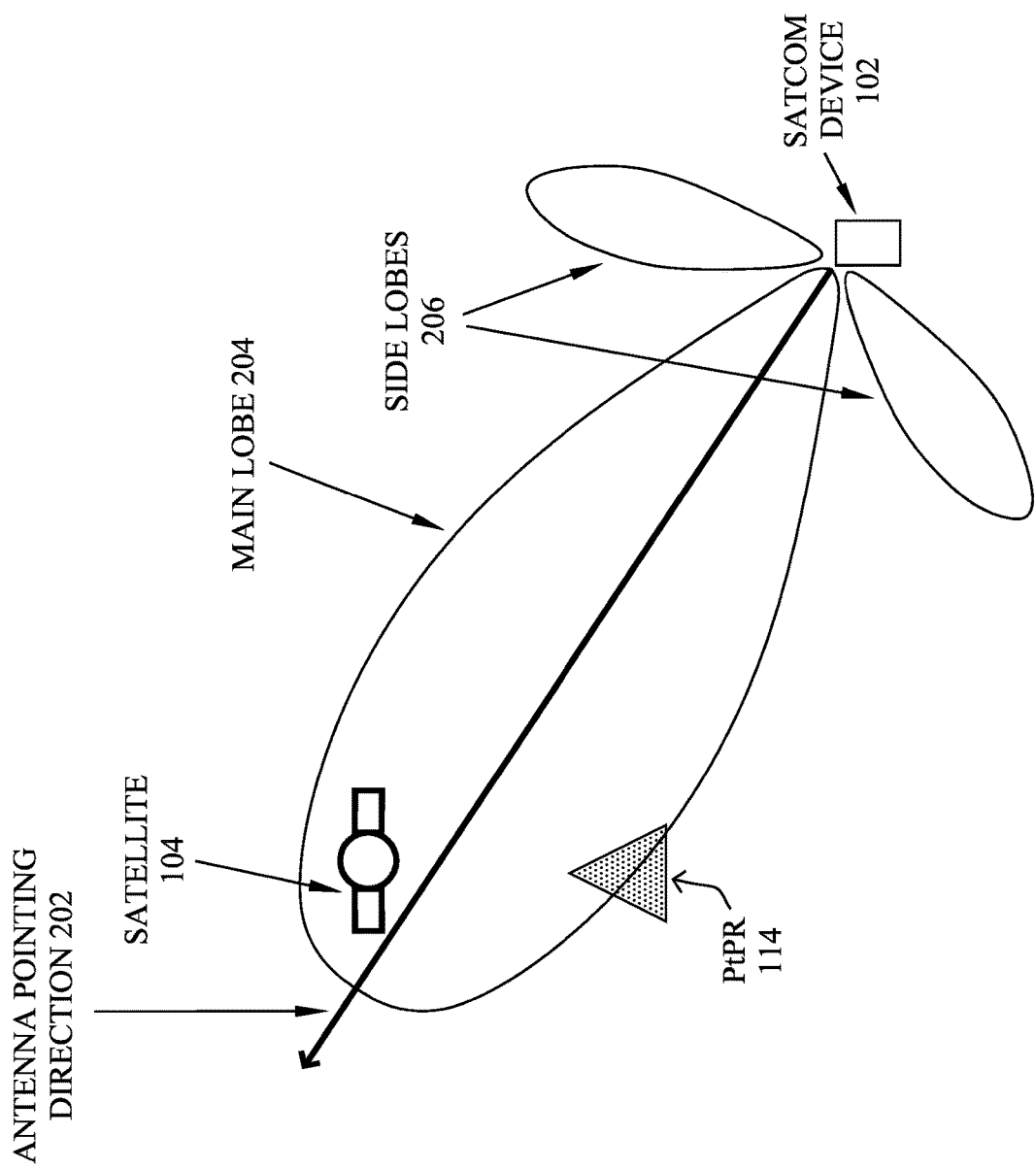
FIG. 2 illustrates an example satellite communication with potential transmission reception at an unintended receiver.

FIG. 2 illustrates a similar scenario in a communication environment 200 wherein the terminal 102 is pointed in a slightly different direction 202, still accommodating the satellite communications to the satellite 104. However, in this scenario, the gain of the terminal's antenna, causing its resultant radiation pattern comprising main lobe 204 and respective side lobes 206, in the direction of the PtPR 114 is large enough to inject interference into the antenna of the PtPR 114. This illustrates the critical role that pointing the antenna of the terminal 102 (e.g., a handheld device) plays in ensuring that the terminal 102 does not interfere with the operations of an unintended receiver (e.g., the incumbent PtPR 114) as well as to avoid transmitting information to unintended (e.g., "eavesdropping") receivers, such as spy satellites, drones, aircraft, etc.

Figure 3:
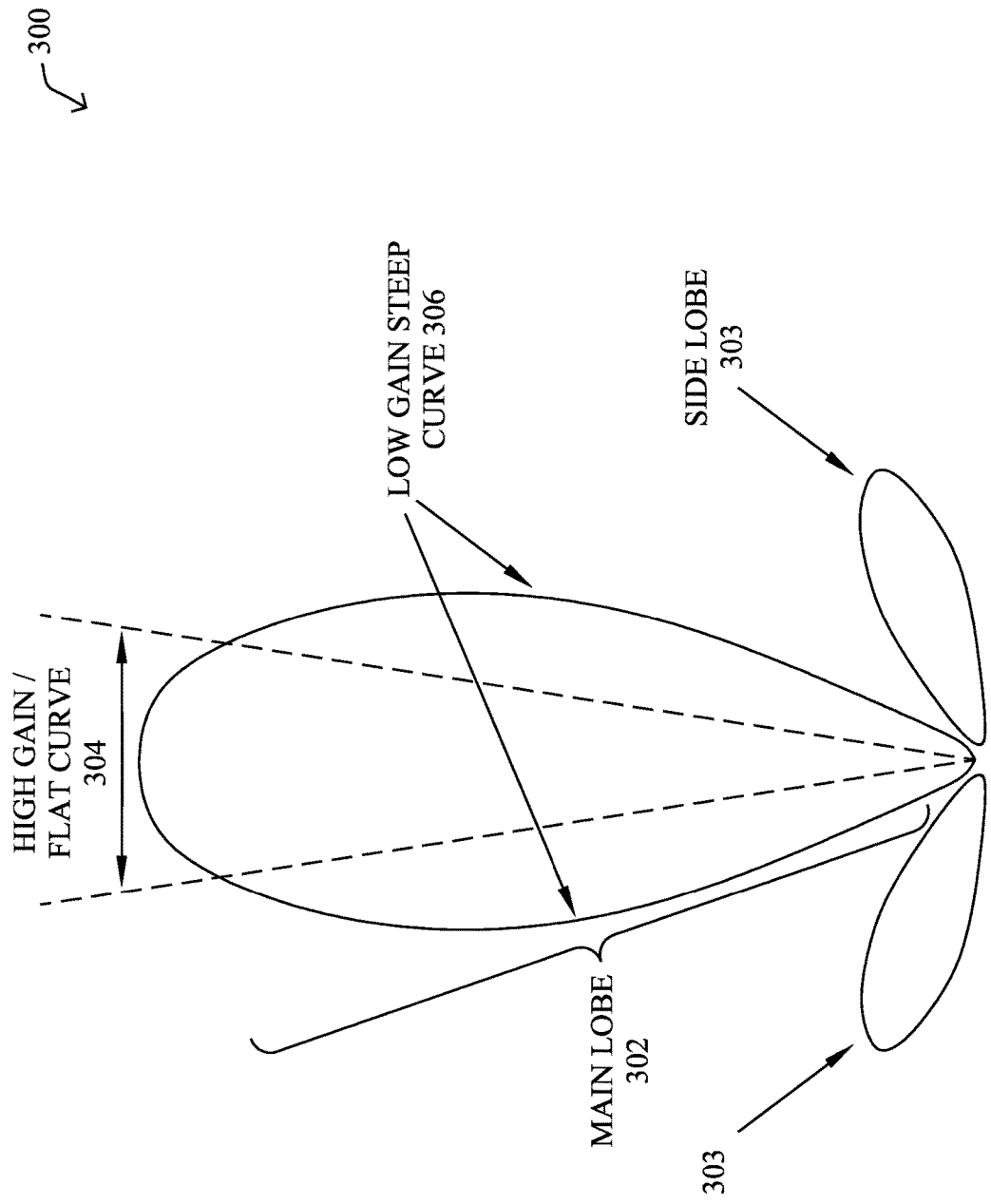
FIG. 3 illustrates an example detail of antenna transmission lobes.

FIG. 3 illustrates a more detailed look 300 at a main lobe 302 (and side lobes 303) of a directional antenna, e.g., of the terminal in FIGS. 1-2 above. To ensure proper communication, a high gain portion 304 of the main lobe 302, as opposed to low gain steep curve(s) 306 of the main lobe 302, must be pointed at an intended receiver (e.g., satellite). However, this high gain portion 304 of the main lobe 302 is a rather flat gain curve (small change in antenna gain towards a second communicating device as a function of the direction in which the antenna is pointed). Changing the direction in which the antenna is pointed towards the satellite within the angle range of the flat curve results in a negligible and/or small change in measurable RSSI from the satellite. Therefore, pointing the antenna of the terminal towards the satellite by maximizing the RSSI from the satellite is challenging, because the RSSI changes very little (as compared with the noise in the measured RSSI) when the direction in which the terminal is pointed is changed within the entire region of the flat curve angular range.

Figure 4A:
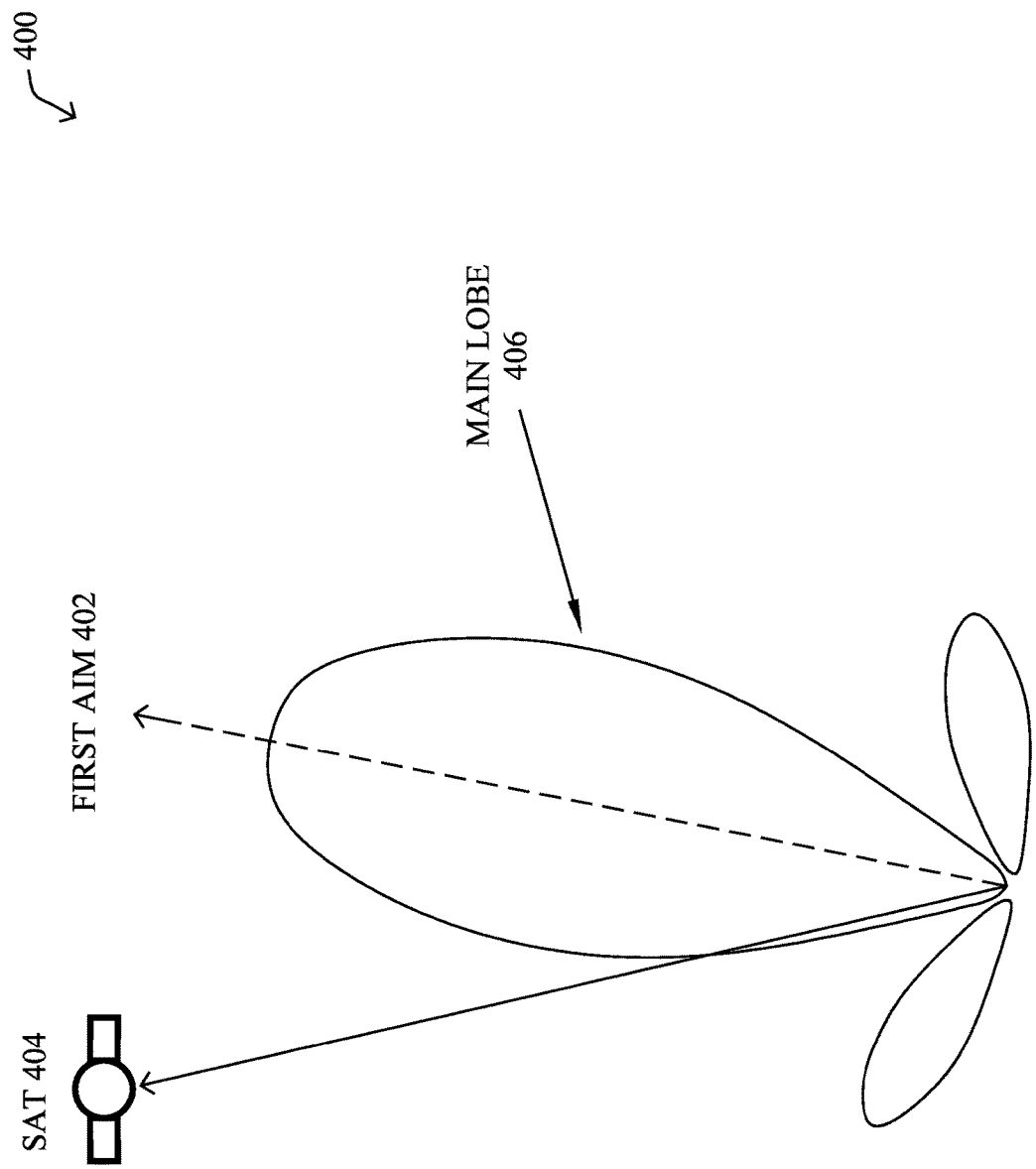
FIGS. 4A-4B illustrate an example of antenna aiming.
Figure 4B:
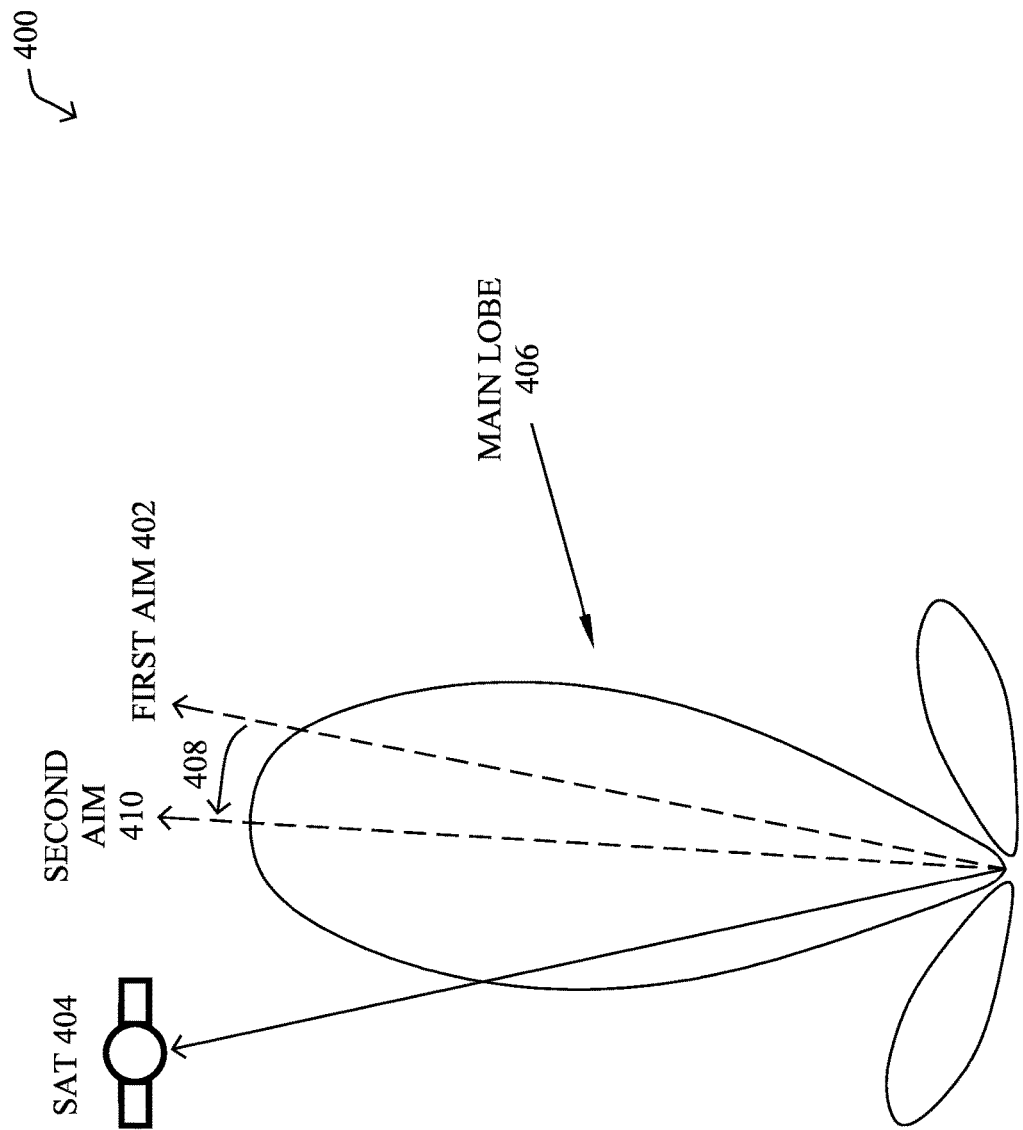

On the other hand, the low gain steep curve(s) 306 of the main lobe 302 (e.g., edges of the lobe) have a gain that changes at a much steeper curve. FIGS. 4A-4B, for instance, illustrate a scenario 400 where only a slight change in aim of an antenna, for example, of the terminal in FIGS. 1-2 above, can result in a large change in RSSI measurement of a signal received from a remote transmitter, e.g., from a satellite. For example, as shown in FIG. 4A, an antenna is pointed towards a first direction or "aim" 402, where the satellite 404 aligns at a position relative to a main lobe 406 that results in a very low antenna gain towards the satellite and consequently in a very low measured RSSI. (i.e., due to the satellite being in the direction along a low gain steep curve). On the other hand, as shown in FIG. 4B, a small change in an angle that the antenna is pointing (angle 408), as shown from the previous "first" aim 402 (of FIG. 4A) to a second aim 410 (shown here in FIG. 4B) results in a large change in RSSI measure of a signal received from the remote transmitter, e.g., from the satellite (e.g., an increase in this instance). Despite the fact that the small angle change 408 results in a relatively small change in the direction in which the antenna is pointed, it nonetheless results in a high variation in the measured RSSI that is caused by a steep part of the gain curve (antenna lobe) towards the satellite (as shows as the low gain steep curve(s) 306 of the main lobe 302 with respect to FIG. 3). However, using this portion of the gain curve results in low antenna gain, which is not sufficient to provide proper communication between the device 102 and the satellite such as satellites 104 or 404. Given the particular constraints on the example environment, particularly the satellite power, the high altitude of a GEO satellite (or other types/altitudes of satellites), and the small aperture of the terminal antenna, the signal received from the satellite may be very low and thus not conducive to support proper communication between the terminal and the satellite. This results in an inability to detect the signal from the satellite (e.g., recover the timing and phase of the signal), or at best, resulting in a very low signal-to-noise ratio (SNR), and as such very low channel capacity.

FIGS. 5A-5D, therefore, illustrate a system in accordance with the techniques herein that can precisely determine the aim of a primary antenna lobe through the introduction of a secondary antenna lobe. In particular, in a system 500, a terminal 502 in accordance with embodiments herein comprises two collocated, fixed antennas whose main lobes 504, 506 are positioned in a slightly different angle (e.g., 10 degrees apart). The two antennas may be physically two different antennas, a phase array antenna with two different feed points, or a Rotman lens antenna which allows multiple antenna beams to be formed without the need for switches or phase shifters. In other words, the two antennas may be collocated with each other, and altogether maybe be collocated with the terminal 502. In another example, the two antennas may be remote from the terminal 502. Other types and/or configurations/relationships of antennas may be used herein, and those mentioned are merely examples—the overall desired result is creating two independent antenna lobes that are offset from one another by a known, predetermined angle 512, as described below.

The main lobe 504 of a first antenna (e.g., antenna illustrated with solid line) points towards a desired direction 508 in a certain orientation (for example a satellite 510 or any other antenna of a remote device), and the main lobe 506 of the second antenna (illustrated with dashed line) points its low-gain steep curve portion towards the same desired direction 508, that is, substantially in line with the center of the high-gain portion of the first antenna lobe (e.g., the direction towards the satellite 510). In other words, the first antenna and the second antenna are collocated and offset from one another by a fixed predetermined angle 512 such that a center of a high gain region of a main lobe of the first antenna is substantially aligned with a low gain region of a main lobe of the second antenna (e.g., 10 degrees as noted above, such as where the main lobe has an approximately 20-degree span, thus aligning the edge of the second antenna's lobe to the center of the first antenna's lobe). Generally, the first antenna is the transmission and receiving antenna, but this is not a necessary limitation here, such as where antenna aiming is used for other purposes not specifically addressed herein (such as for device aiming generally). Similarly, and without limitation, the second antenna is generally used only for receiving.

As explained with reference to FIGS. 3-4B, the signal received by the first antenna (and its associated main lobe 504) is not sensitive enough to change in the direction the antenna is pointing to facilitate directional aiming based on maximizing RSSI. On the other hand, the signal received by the second antenna (and its associated main lobe 506) is too weak to facilitate proper signal reception, potentially including the detection of phase and timing of symbols. However, as described below, the techniques herein can differentiate between various aims 508, 514, and 516 of FIGS. 5A-5C, which are all within the high-gain portion of the main lobe 504 of the first antenna, by determining where along the corresponding low-gain curve of the second antenna main lobe 506 is pointing (regions 520a-c).

Figure 5A:
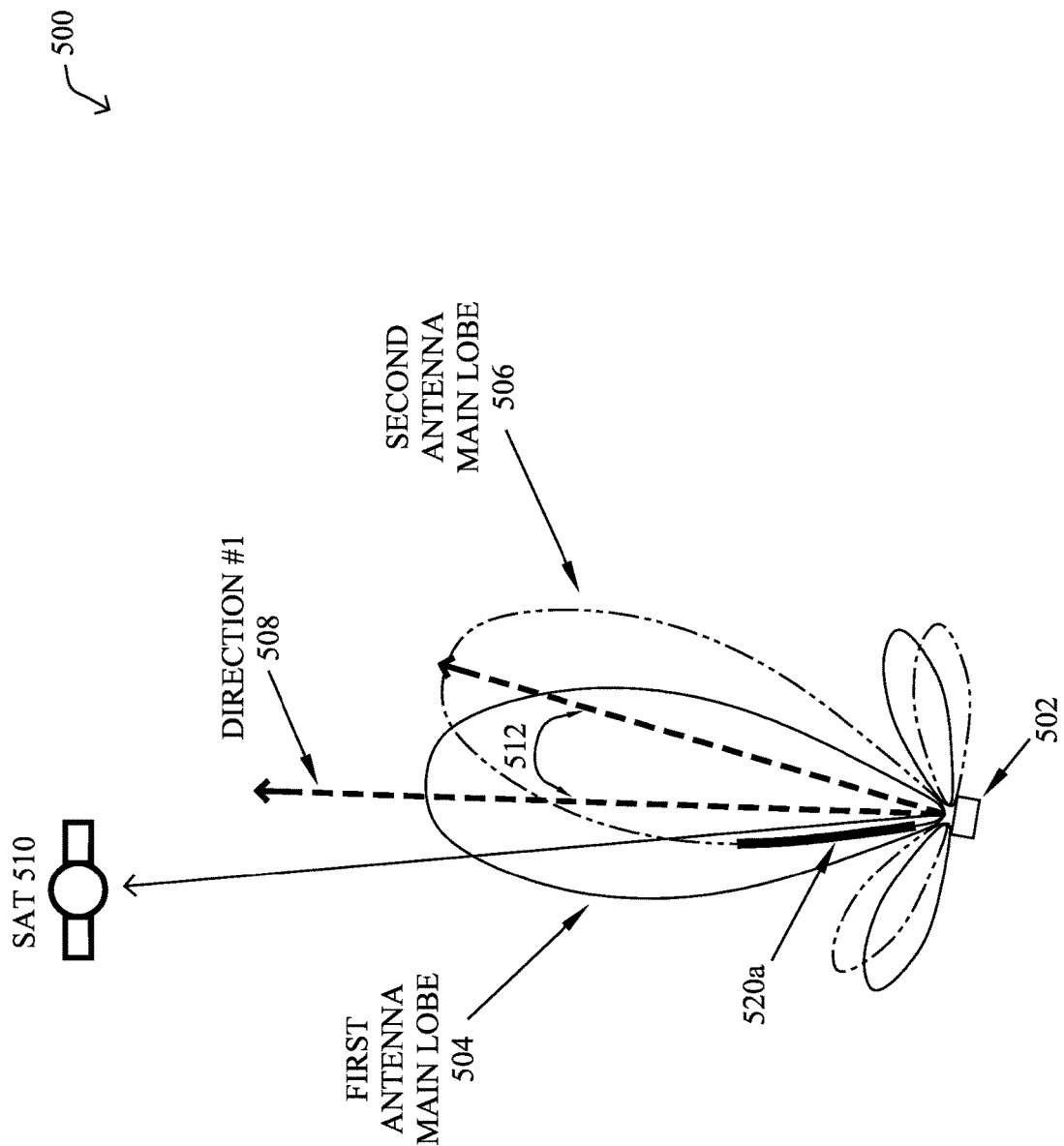
FIGS. 5A-5D illustrate an example of precise antenna aiming in accordance with one or more embodiments of the present disclosure.
Figure 5B:
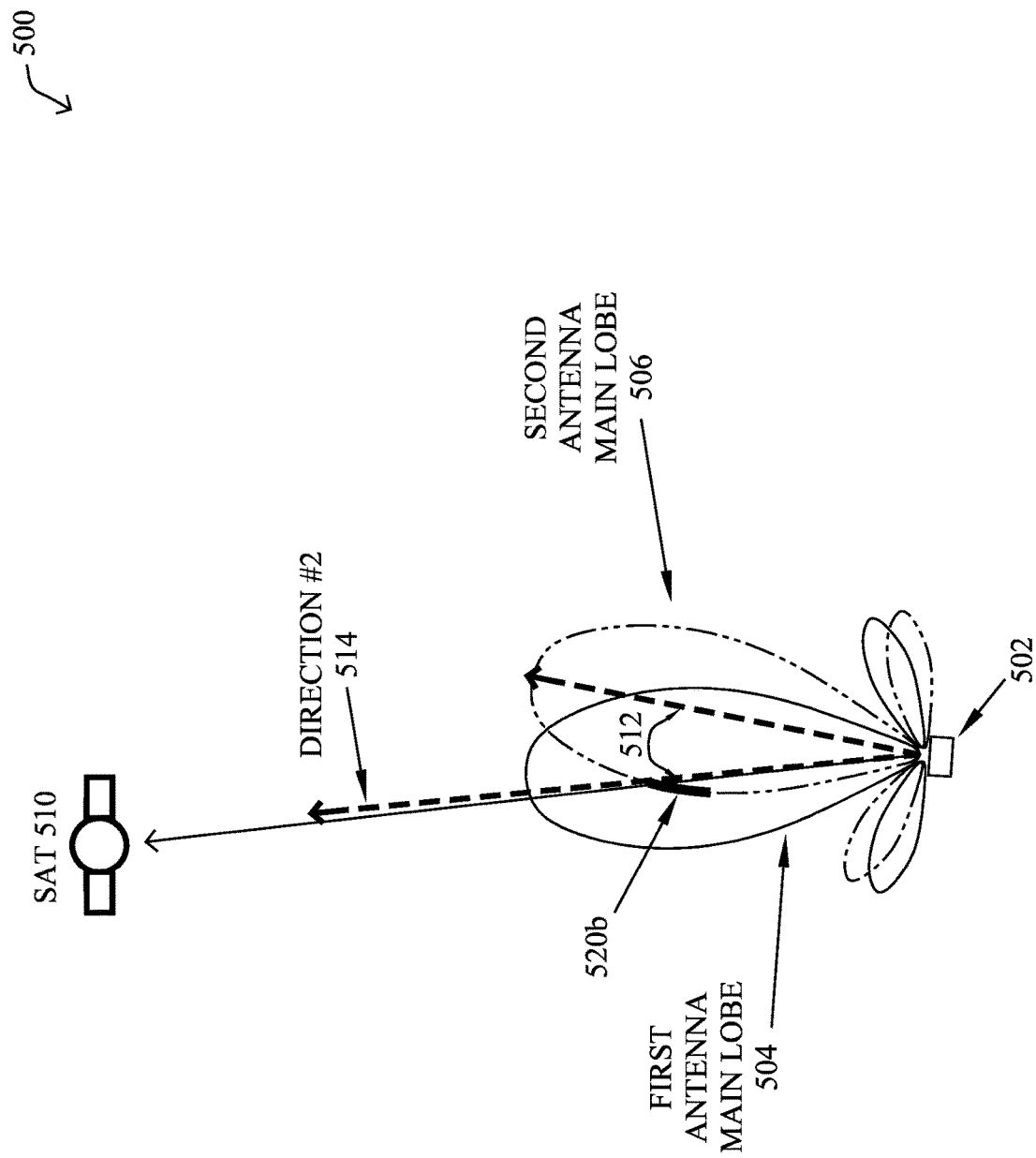
Figure 5C:
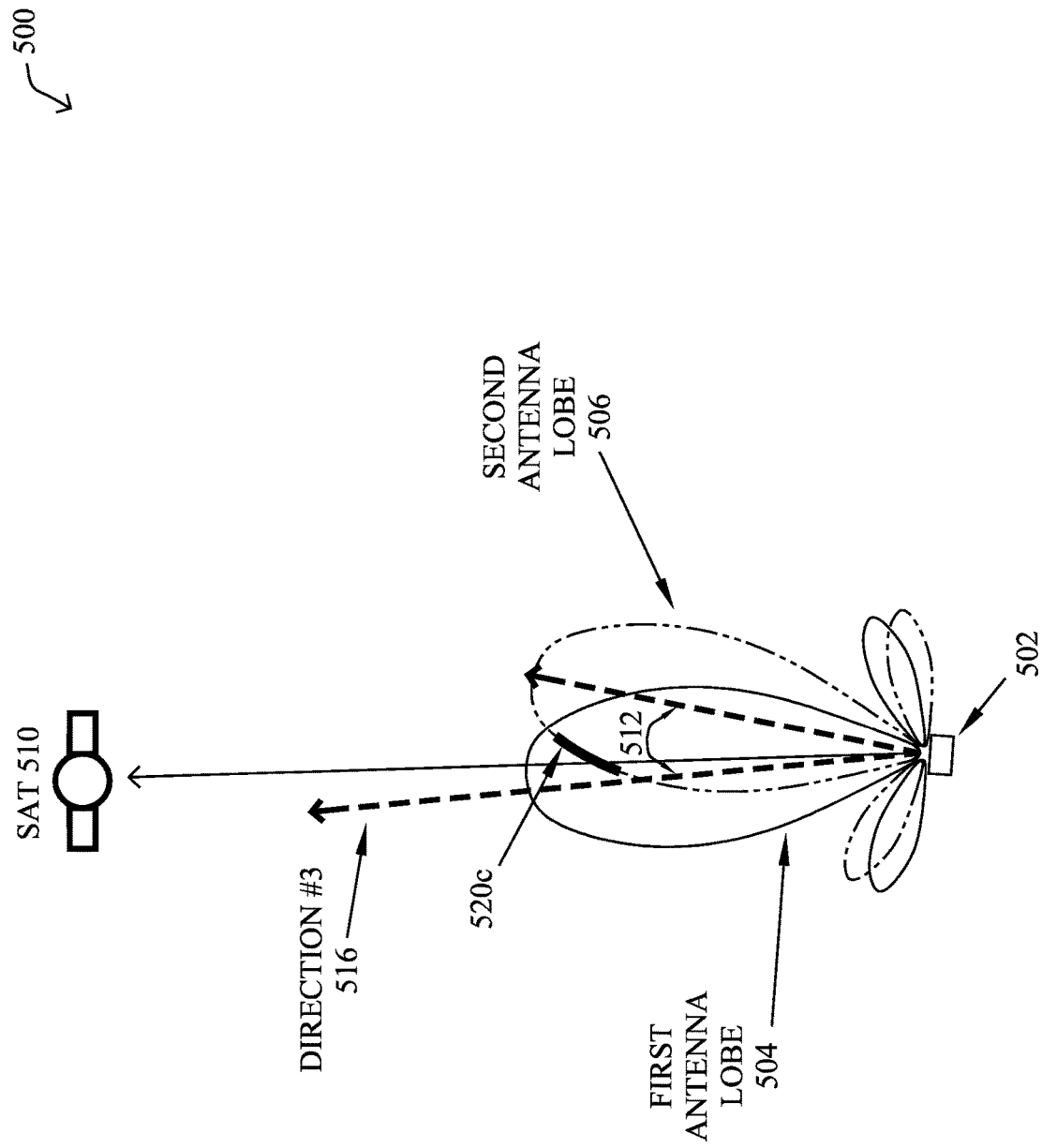

For instance, in FIG. 5A, due to the direction 508 (#1) of the main lobe 504 of the first antenna, the main lobe 506 of the second antenna has very small gain (e.g., near zero, and generally (much) less than a predetermined threshold, e.g., 50%) resulting in very low RSSI value for the signal received from the satellite 510, due to the particular alignment of the low gain steep curve of the second antenna's main lobe 506 towards the satellite 510 (i.e., receiving the satellite signal within the lowest region 520a). In FIG. 5B, however, the main lobe 506 of the second antenna has a mid-level/medium gain (e.g., at or around 50% of the gain of main lobe 504) resulting in a mid-level RSSI value for the signal received from the satellite 510, due to direction #2 (514, notably with the first antenna pointing generally directly at the satellite 510) causing the middle region 520b of low gain steep curve of the second antenna main lobe 506 to be in alignment with the direction towards satellite 510. Turning to FIG. 5C, the main lobe 506 of the second antenna has a higher gain (than in FIG. 5B) due to direction #3 (516) causing the upper region 520c of low gain steep curve of the second antenna main lobe 506 to now be in alignment with the direction towards satellite 510. However, the second antenna still does not have the same gain as the gain of the main lobe of the first antenna 504 in the direction of the satellite 510 (e.g., greater than 50% of the gain of main lobe 504, but measurably less than 100%), resulting in a slightly higher RSSI value for the signal received from the satellite 510 at the second antenna, but still reasonably below the RSSI value for the signal received from the satellite at the first antenna.

Figure 5D:
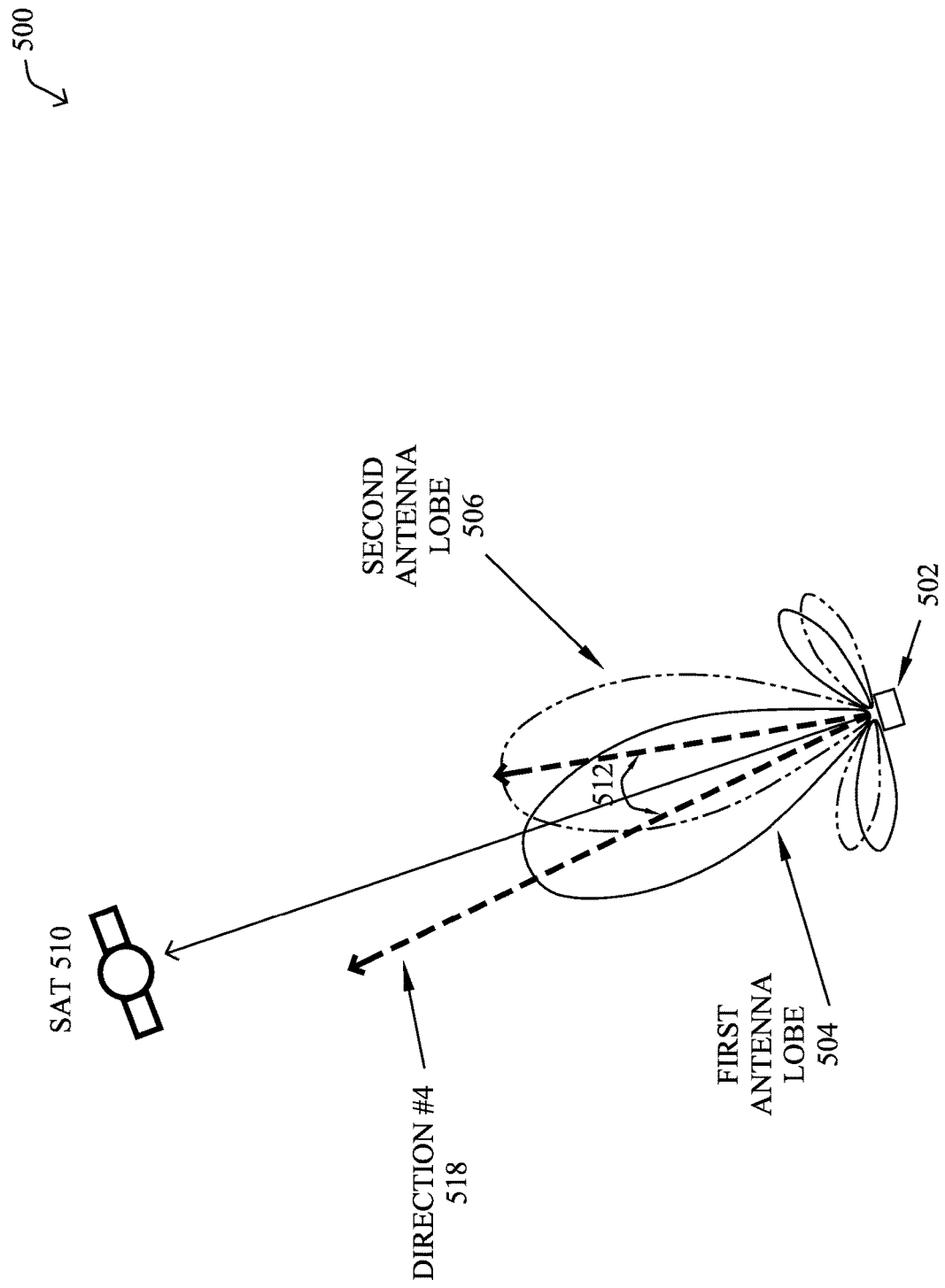

Notably, progressing further along in this direction, as shown in FIG. 5D, the second antenna main lobe 506 would eventually have close to the same gain as the gain of the main lobe of the first antenna 504 in the direction #4 (518) of the satellite 510, resulting in the same (or similar) RSSI values of the signal received from the satellite 510 at both the first and second antennas, due to the high gain flat curves of both the first and second antenna main lobes being generally in alignment with the transmitter/satellite.

Based on this differential information, the techniques herein can therefore precisely aim the primary antenna's main lobe 504 based on correspondingly knowing where along the secondary antenna's main lobe 506 the radio source (e.g., transmitter, satellite, etc.) is located (e.g., particularly regions 520a, 520b, 520c, or otherwise, as described below). That is, while there is a notable difference in the RSSI measured from the signal received by the secondary antenna, FIGS. 5A-5C illustrate that the RSSI of the signal received via the first antenna exhibits minimal variation. This variation in the difference, in combination with the known offset 512 between the aim of the first and second antennas, can thus be used to precisely aim the first antenna according to the techniques herein (e.g., toward an intended receiver/satellite for transmitting signals, away from an unintended receiver to avoid interference/eavesdropping, toward a specific transmitter for receiving signals, and/or toward a specific transmitter for use with angle-based positioning).

Figure 6:
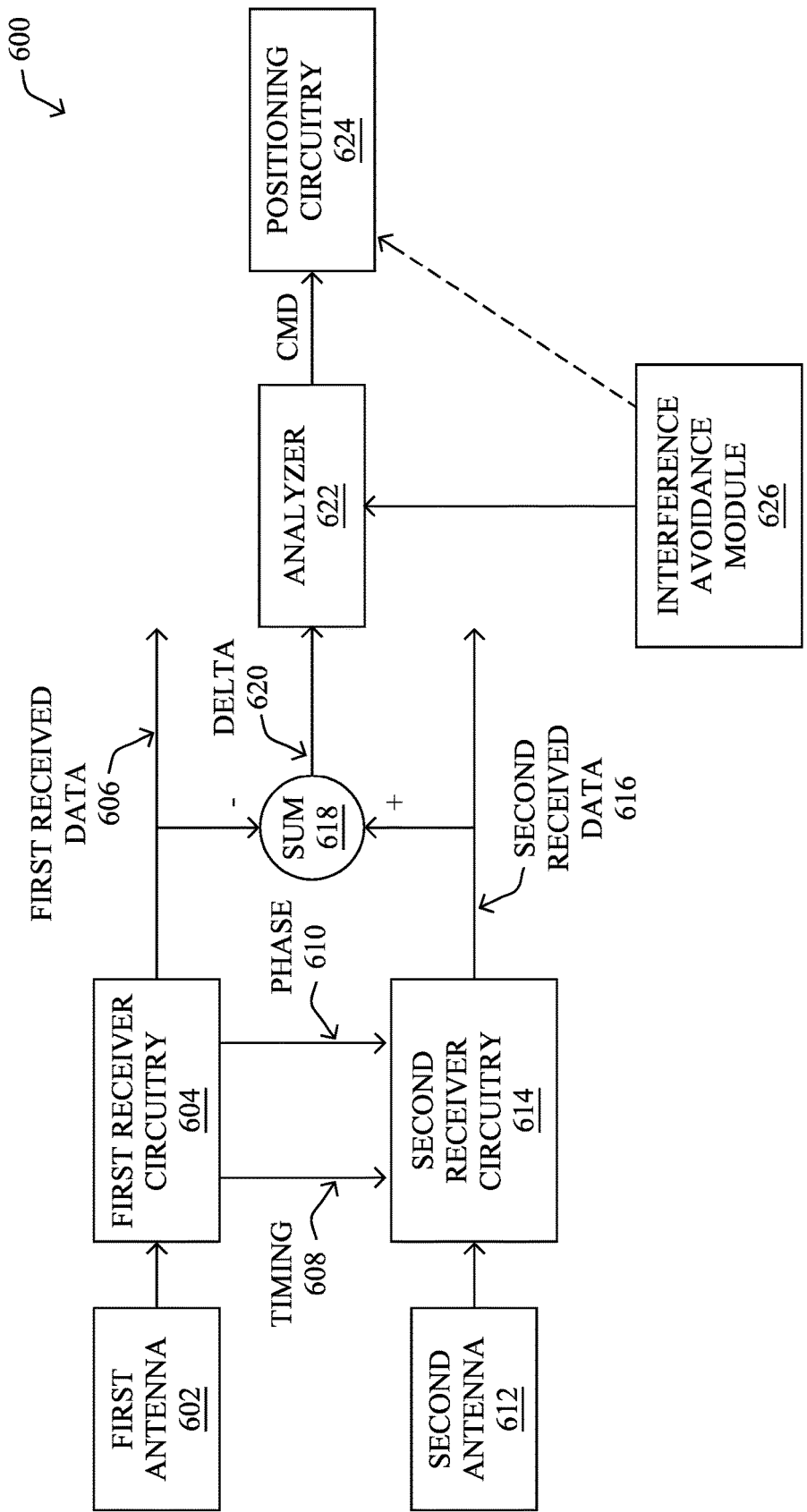
FIG. 6 illustrates an example of circuitry logic for precise antenna aiming in accordance with one or more embodiments of the present disclosure.

FIG. 6, therefore, is an illustrative diagram of a system 600 in accordance with the techniques herein in order to compute the differences discussed above. For instance, a first antenna 602 may be positioned substantially towards a transmitter (e.g., a GEO satellite), and as such it receives a strong enough signal to facilitate communication with the transmitter (which may be an intended receiver, such as a receiver of the GEO satellite). The signal received at the first antenna 602 is processed by a first receiver circuitry 604, which produces as its output the data 606 (symbols or data set) communicated by the transmitter. In addition, the first receiver circuitry 604 also generates signals that convey information used for decoding the received signal such as but not limited to the phase 610 and timing 608 of the received signals it used in recovering the data 606 from the signal received by the first antenna 602. It should be noted that since a second antenna 612 is arranged (or oriented) to point slightly away from the remote transmitter when the first antenna is pointed at the remote transmitter, the signal at the second antenna (i.e., when received on the low gain steep curve of the second antenna main lobe) may be, and often is, too weak to detect and recover information required for properly recovering the transmitted data, e.g., the phase and timing of the signal sent from the remote transmitter and received by second antenna 612. In other words, when the signal is too weak to allow detection of its phase and timing, the signal itself may merely appear as noise, and any data contained within the signal would also be undetectable.

According to the techniques herein, therefore, rather than attempting to decode information required for properly recovering the transmitted data such as the phase and timing of the signal received from the second antenna 612 (if any is gathered), a second receiver circuitry 614 may advantageously use the decoded information such as timing 608 and/or phase 610 and/or other parameters (or characteristics) from the signal as detected by the first receiver circuitry 604. Given the weak second signal (very low SNR) at the second antenna, even with utilizing or "borrowing" the phase 610 and timing 608 (or other suitable parameters) obtained from the first receiver circuitry, the second receiver circuitry may still have difficulty detecting the symbols (data set) within the signal as transmitted from the transmitter (e.g., satellite), thereby potentially limiting the validity of the output data 616 associated with what the second antenna 612 has detected/received. As such, while the first receiver circuitry 604 is able to detect the majority (e.g., close to 100%) of the symbols of the data set transmitted from the transmitter, the second receiver circuitry 614, within certain orientations as noted above, is only capable of detecting a much smaller percentage of the symbols (or characteristics of this signal). The specific percentage of symbols detected by the second receiver circuitry depends on the SNR of the received signal, which in turn depends on whether the steep gain curve of the second antenna is pointed towards the transmitter, e.g., the satellite, as detailed above.

In one embodiment, the data set outputs from the first and second receiver circuitries 604, 614 are determined and compared, for example by a comparator, in the summation point 618, which differences the two data set outputs, resulting in a delta 620 (or difference) between the outputs. When the two outputs convey the same symbols (data sets), such as when the antenna is aimed in a direction described in FIG. 5D above, the output from the comparator is zero. However, when the antenna of the device is aimed at a direction such as the ones illustrated in FIGS. 5A-5C, the first data set output conveys recognizable data and the output from the second receiver is different (due to the inability of the second receiver to detect all of the symbols), the output of the summation point 618 is non-zero. The delta 620 from the comparator is passed to an analyzer 622 which calculates the percentage of successful symbol detections and compares it to a predetermined threshold, for example, 50%. In accordance with another example implementation, the output 606 from the first receiver circuitry 604 is also fed into the analyzer (not shown for sake of simplicity).

When the analyzer 622 detects a percentage greater than, for example, 50%, it determines that the second antenna is pointing too directly towards the satellite (e.g., as in FIG. 5C, receiving the signal on the upper region 520c of the low gain steep curve of the second antenna main lobe 506) and may issue a command to point the terminal (and its attached antennas) in a direction that moves the direction of the second antenna away from the satellite, illustratively aiming the first antenna more toward the satellite (as in FIG. 5B). However, when the analyzer 622 detects a percentage lower than, e.g., 50%, it concludes that the second antenna is pointing too far away from the satellite (e.g., as in FIG. 5A, receiving the signal on the lower region 520a of the low gain steep curve of the second antenna main lobe 506), and may issue a command to point the terminal (and its attached antennas) more towards the satellite (e.g., as in FIG. 5B). In either case, the change in measured RSSI value of a signal received from the satellite via the first antenna is negligibly small and as such it does not affect the operations or the ability of the first receiver to properly decode the information transmitted from the satellite.

Notably, the discussion above generally attempts to aim the first antenna (the main lobe of the first antenna) directly at the transmitter. However, as noted herein, other commands may be given based on the determined aim of the first antenna and its difference from a desired aim of the first antenna, such as to specifically avoid interference with, or eavesdropping by, an unintended receiver, or other purposes, as detailed herein.

Figure 7:
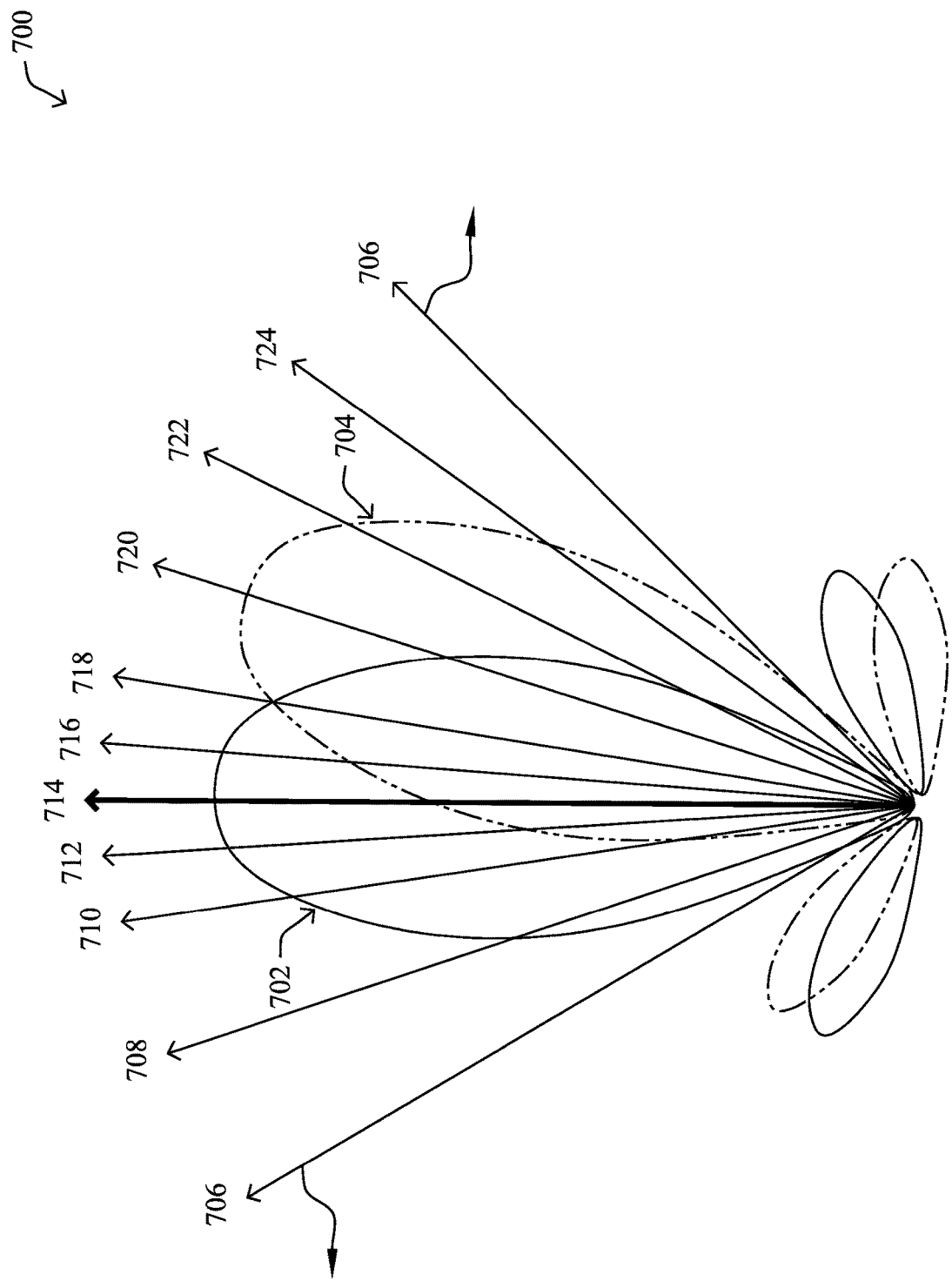
FIG. 7 illustrates example determinations with respect to orientation(s) and resultant aim(s) of a main lobe of a first antenna and a main lobe of a second antenna.

With reference to FIG. 7, example determinations that the analyzer 622 may ascertain are illustrated with respect to orientation(s) and resultant aim(s) 700 of a main lobe of a first antenna 702 and a main lobe of a second antenna 704. In particular, as described above, the analyzer 622 may determine that the calculated delta 620 is indicative of the orientation and aim of the collocated antennas being indicative of a remote transmitter (e.g., satellite) being located at any of the following directions:

a transmitter being in any range of directions 706 (notably on either side of the figure), where the main lobe 702 of the first antenna and the main lobe 704 of the second antenna have a substantially zero gain and consequently receive no signals (note that side lobe reception within directions 706 would generally result in negligibly low signal strength on either/both antennas);

a transmitter being in a direction 708, where the main lobe 702 of the first antenna 702 has a very low gain and consequently a very low SNR that can facilitate decoding only a small percentage of symbols from the received signals and the gain of the main lobe 704 of the second antenna results in receiving no signals;

a transmitter being in a direction 710, where the main lobe 702 of the first antenna has a high gain and consequently is able to receive high signal strength and the gain of the main lobe 704 of the second antenna is substantially zero and therefore still receives no (or very few) signals;

a transmitter being in a direction 712, where the main lobe 702 of the first antenna has a high gain and consequently is able to receive high signal strength and the gain of the main lobe 704 of the second antenna receives a very low SNR (indicative of being on the lower end (520*a*) of the low-gain portion of the main lobe 704 of the second antenna) and thus has a very high error rate of decoding the data symbols;

a transmitter being in a direction 714, where the main lobe 702 of the first antenna has a high gain and consequently is able to receive high signal strength and the gain of the main lobe 704 of the second antenna receives a medium SNR and therefore has an error rate of a specific value, e.g., 50% or otherwise, being able to detect a medium number of received symbols (e.g., 50%, indicative of being near the center region 520*b* of the low-gain (steep curve) portion of the main lobe 704 of the second antenna, and thus indicating that the aim of the main lobe 702 of the first antenna is centered on the remote transmitter/satellite);

a transmitter being in a direction 716, where the main lobe 702 of the first antenna has a high gain and consequently is able to receive high signal strength and the gain of the main lobe 704 of the second antenna receives a slightly higher SNR and therefore has a better error rate and can detect a slightly higher number of received symbols, but still not a high signal strength (indicative of being on the upper/higher end (region 520*c*) of the low-gain portion of the main lobe 704 of the second antenna);

a transmitter being in a direction 718, where both the main lobe 702 of the first antenna and the main lobe 704 of the second antenna have a high gain and are consequently able to receive a high signal strength to thus detect a high (e.g., equal) number of received symbols;

a transmitter being in a direction 720, where the main lobe 702 of the first antenna has a low gain and is thus only able to receive a low signal strength and can only decode a low number of symbols, while the main lobe 704 of the second antenna still has a high gain and is thus able to receive a high signal strength and thus can decode a high number of received symbols. It should be noted that in one example implementation when the second receiver relies solely on parameters extracted from the signal received by the first antenna, if the low signal at the first antenna prevents proper recovery of signal parameters, the ability of the second receiver to decode the symbols (data set) may be impaired as well;

a transmitter being in a direction 722, where the gain of the main lobe 702 of the first antenna is substantially zero and therefore receives no (or very few) signals and the main lobe 704 of the second antenna still has a high gain and consequently is able to receive high signal strength and thus can decode a high number of received symbols. It should be noted that in one example implementation when the second receiver relies solely on parameters extracted from the signal received by the first antenna, if the low signal at the first antenna prevents proper recovery of signal parameters, the ability of the second receiver to decode the symbols (data set) may be impaired as well; or a transmitter being in a direction 724, where the gain of the main lobe 702 of the first antenna receives no signals and the main lobe 704 of the second antenna has a very low gain and consequently a very low SNR that can facilitate decoding only a small percentage of symbols from the received signals. It should be noted that in one example implementation when the second receiver relies solely on parameters extracted from the signal received by the first antenna, if the low signal at the first antenna prevents proper recovery of signal parameters, the ability of the second receiver to decode the symbols (data set) may be impaired as well It is to be understood that the analyzer 622 may be configured to confirm that the first antenna is aimed toward the remote transmitter's antenna, e.g., the antenna of the remote satellite, in a sufficient fashion (e.g., satisfying received signal quality requirements, transmission non-interference, avoidance of transmission to unintended receivers, etc.) in the case of pointing the main lobe of the first antenna directly towards the desired satellite (i.e., the transmitter is in direction 714 above), thereby being indicative of the signal being received within the center of the high gain region of the main lobe 702 of the first antenna while also being received generally within the center of the low gain region (region 520*b* above) of the main lobe 704 of the second antenna. (Notably, other more granular aims/regions, or more coarse aims/regions, may be determined by the analyzer, and the example aims and/or regions noted above are merely illustrative examples.)

Further, the specific percentage depends on the power of the transmitter, which, illustratively, is well known for each satellite. In accordance with one embodiment, the specific threshold (e.g., 50%) may be adjusted for each transmitter based on the power of the transmitter. In accordance with yet another embodiment, the gain of the second receiver may be adjusted to compensate for the power of the transmitter. In accordance with yet another embodiment, the direction is determined in order to have an acceptable ratio between the RSSI of the signal received in the first antenna and the RSSI of the signal received via the second antenna.

Returning to FIG. 6, in accordance with one embodiment, positioning circuitry 624 may provide guidance to a person (e.g., by causing instructions, guidance, etc. to be presented on a graphical user interface (GUI)) and instructs him to point the terminal in a direction that results in the predetermined percentage (e.g., 50%) of properly detected symbols by the second receiver. In accordance with yet another embodiment, the command signal from the positioning circuitry 624 is fed to motors, for example, step motors that automatically change the direction in which the antenna points in order to achieve the predetermined percentage of properly detected symbols by the second receiver. (Again, the directed aim of the terminal, i.e., of the first antenna of the terminal, may be directly at the remote transmitter/ satellite (e.g., an intended receiver), or to any other desired direction based on knowing the precise aim of the first antenna, accordingly, such as to avoid interference/eavesdropping or otherwise.)

Note further that while comparator logic is shown and described to determine a difference in the percentage of successful symbol detections, other forms of analysis may be made, such as processing individual values for their own purpose, or a hybrid of individual and combined thresholds. For example, one embodiment may require the first receiver's percentage to be above a certain threshold (e.g., 95%) to be able to receive (and thus transmit) understandable symbols, and then may use the second receiver's percentage separately against its own certain threshold (e.g., 50% of symbols), rather than merely a comparison with (differential below) the first receiver's percentage (e.g., not being 50 percentage points below, say 95% (i.e., 95%−50%=45%), but rather being 50% regardless of whether the first receiver is anywhere between 95-100%). In another embodiment, the first receiver must have an acceptable output of symbols (e.g., 95%), and the second receiver's percentage can be a percentage of that (e.g., 50% of 95%, or 47.5%) or a differential from that (e.g., 50% below 95%, or 45%). In other words, the techniques herein may take any number of implemented paths to both confirm the appropriate reception percentage of the first receiver, as well as to determine the relative position of the two antenna lobes based on some differentiation between reception rates of the first and second antenna lobes.

In addition to confirming a signal being received within the center of the high gain region of the main lobe of the first antenna while also being received within the low gain region of the main lobe of the second antenna (e.g., substantially the center of the low gain region), an interference avoidance module 626 may be configured to determine whether a potential transmission using the first antenna would cause interference with one or more unintended receivers or be sent to one or more unintended receivers. If the system determines that transmitting directly towards the target satellite would cause interference, the system, and specifically the interference avoidance module 626, instructs the user/motors to direct the mobile device slightly, e.g., 4 degrees, away from the direction towards the target satellite. This is achieved by changing the target percentage of properly detected symbols e.g., from 50% to 35% for movement in one direction (e.g., FIG. 5A above), or from 50% to 65% for movement in the other direction (e.g., FIG. 5C above).

Figure 8A:
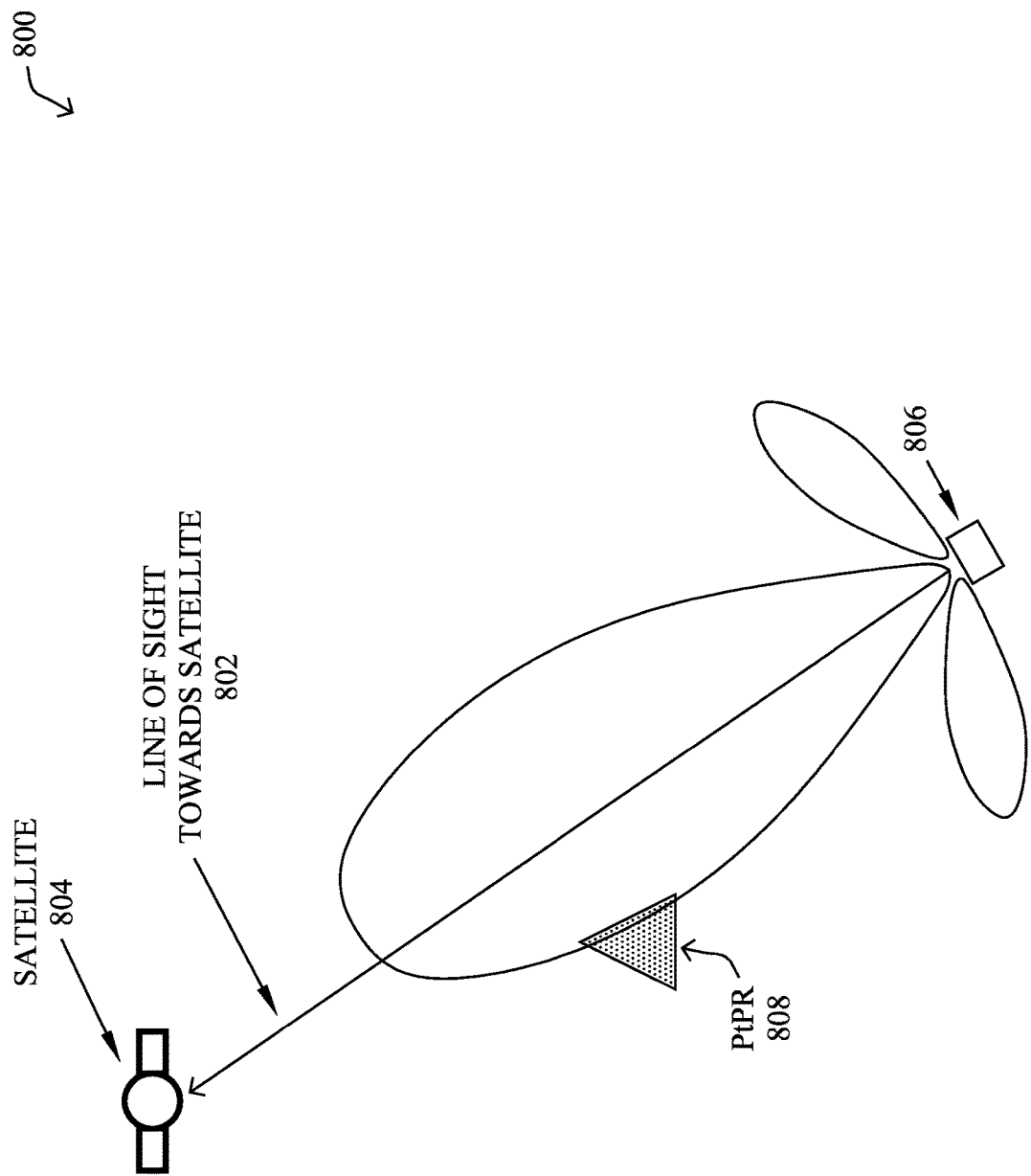
FIGS. 8A-8B illustrate an example of precisely adjusting antenna aim to avoid having a transmission reach an unintended receiver in accordance with one or more embodiments of the present disclosure.
Figure 8B:
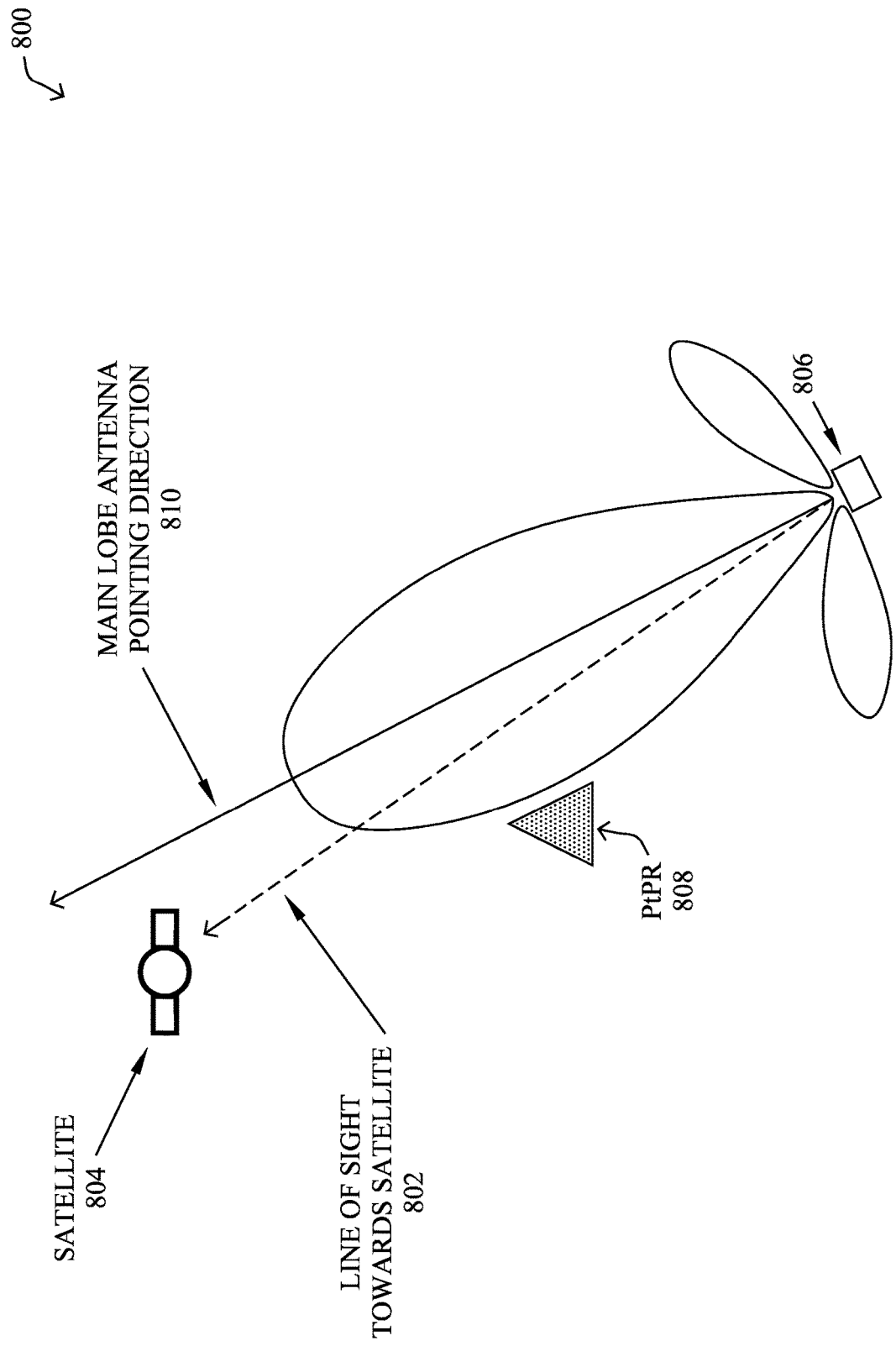

Referring to FIG. 8A, in accordance with yet another aspect of the techniques herein, an example 800 of when a line of sight 802 towards an intended receiver 804 (e.g., satellite) of a terminal 806 is close to the line of sight towards an unintended receiver 808 (e.g., PtPR), directing a first antenna of the terminal towards the terminal may cause interference with the unintended receiver (e.g., PtPR). To ensure that a transmission towards the satellite 804 does not cause interference with the incumbent PtPR 808, the first antenna of the receiver needs to be pointed in a direction 810 slightly away from the PtPR, as illustrated in FIG. 8B. As stated above, given the flat gain curve of the first antenna main lobe, the RSSI of a signal received by the first antenna from the satellite remains substantially unchanged when the device is pointed slightly away from the direction directly towards the satellite; however, the reduced gain towards the PtPR ensures that the terminal does not interfere with the operations of the incumbent PtPR. In accordance with this embodiment, in order to point the main lobe (of the first antenna) slightly away from the line of sight towards the satellite, the system automatically adjusts the target percent of properly detected symbols by the second receiver, as described above (e.g., depending upon the desired change in the antenna pointing direction).

Referring back to FIG. 6, the interference avoidance module 626 may assess whether pointing the first antenna towards the satellite may interfere with any PtPR. If the module determines that the transmission by the terminal via the first antenna would not interfere with the operations of the PtPR, the interference module sends a command to the analyzer to point the first antenna directly at the satellite. As a result, as explained above, the analyzer 622 would ensure that the first antenna is positioned in a direction resulting in pointing first antenna towards a preferred target portion, for example, 50%, of proper symbol detection by the second receiver. However, if the interference module determines that the first antenna should be pointed away from the satellite (as illustrated in FIG. 8B), it sends the appropriate instruction to the analyzer. As a result, the analyzer 622 may change the target percentage of successful symbol detection to a lower value (further down the edge of the second antenna lobe), such as, e.g., from 50%, to 35%. In accordance with another embodiment, the desired deviation angle may be sent directly to the positioning circuitry (e.g., a 5-degree angular off-center correction). In another use case, if the interference module determines that the first antenna should be pointed away from the satellite, it sends the appropriate instruction to the analyzer. As a result, the analyzer 622 may change the target percentage of successful symbol detection to a higher value (further up the edge of the second antenna lobe), such as, e.g., from 50%, to 65%.

Figure 9:
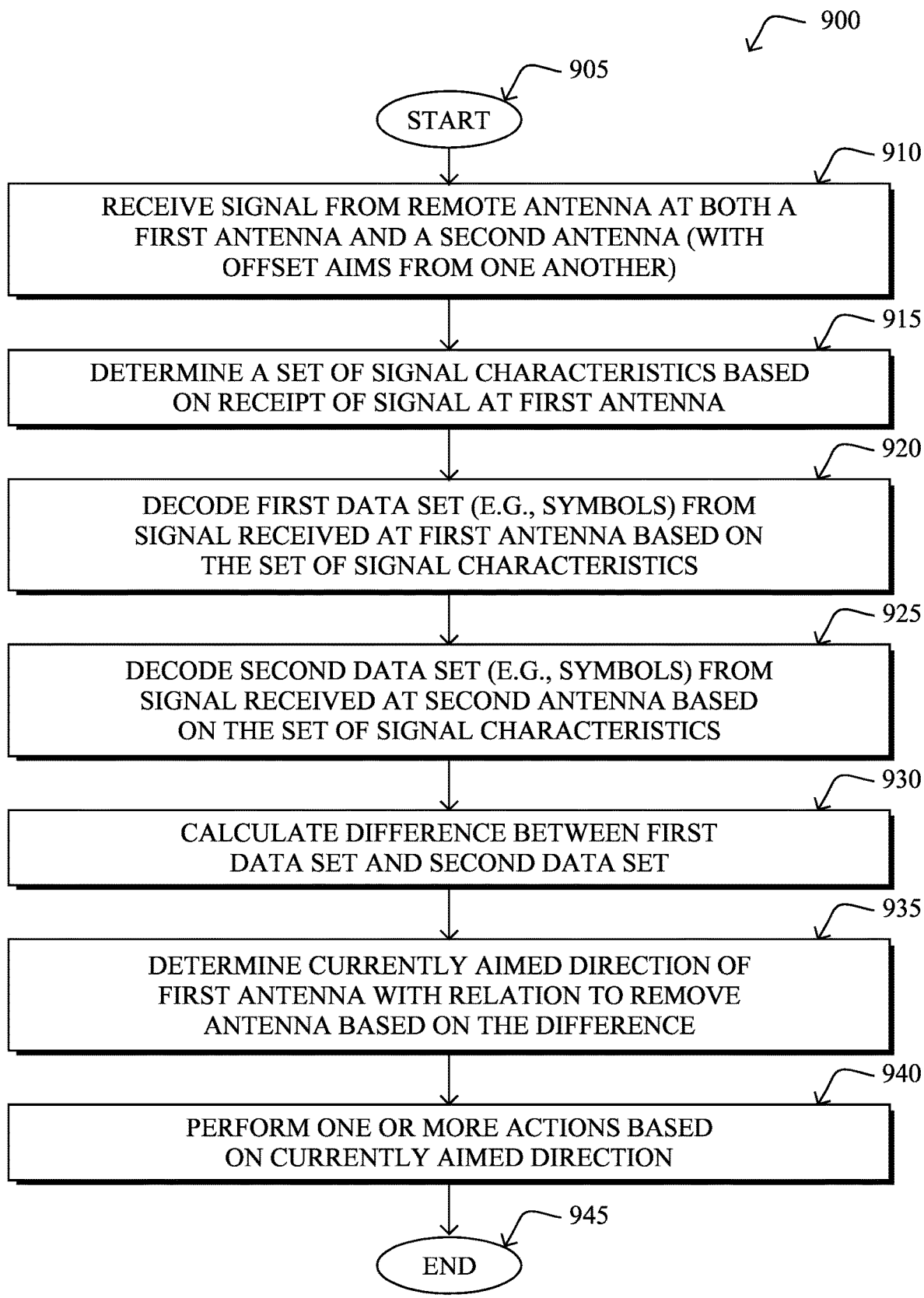
FIG. 9 illustrates an example simplified procedure for precise antenna aiming in accordance with one or more embodiments of the present disclosure.

FIG. 9 illustrates an example simplified procedure for precise antenna aiming, in accordance with one or more embodiments described herein. For example, a non-generic, specifically configured device (e.g., device 1200, below, an apparatus, etc.) may perform procedure 900 by executing stored instructions (e.g., process 1248, below). The procedure 900 may start at step 905, and continues to step 910, where, as described in greater detail above, a device may receive a signal from a remote antenna (e.g., a satellite) at both a first antenna and a second antenna, the first antenna and the second antenna being collocated and offset from one another by a fixed predetermined angle such that a center of a high gain region of a main lobe of the first antenna is substantially aligned with a low gain region of a main lobe of the second antenna. Further, a received signal strength indicator (RSSI) of the signal from the remote antenna received at the high gain region of the main lobe of the first antenna remains substantially the same throughout a range of directions that correspond to the signal from the remote antenna being received within the low gain region of the main lobe of the second antenna. It is also to be understood that the device may comprise the first antenna and the second antenna; the device may be collocated with the first antenna and the second antenna; or that the device may be remote from the first antenna and the second antenna.

In step 915, the device may then determine a set of signal characteristics of the signal based on the signal being received at the first antenna, such as the timing parameters and phase parameters of the signal. In step 920, as described in greater detail above, the device may then decode a first data set (e.g., symbols) based on the signal being received at the first antenna using the set of signal characteristics (e.g., phase and timing), and in step 925 also decodes a second data set (e.g., symbols) based on the signal being received at the second antenna using the set of signal characteristics (i.e., as determined based on the signal being received at the first antenna in step 915 above).

At step 930, the device may calculate a difference between the first data set and the second data set. At step 935, the device may then determine a currently aimed direction of the first antenna with relation to the remote antenna based on the difference between the first data set and the second data set. For instance, in one embodiment, the device may confirm that the currently aimed direction of the first antenna is pointing directly at the remote antenna, such as when the difference between the first data set and the second data set is within a range indicative of the signal being received within the center of the high gain region of the main lobe of the first antenna while also being received within a center of the low gain region of the main lobe of the second antenna (e.g., substantially near the center of the low gain region of the main lobe of the second antenna), such as when the remote antenna is in position/direction 714 in FIG. 7 above. In addition, the device may determine that the calculated difference is indicative of the low gain region of the main lobe of the second antenna being pointed too directly toward (e.g., position 716) or too far away from (e.g., position 712) the remote antenna, as described above. For example, where the first data set and the second data set comprise a first quantity of symbols and second quantity of symbols, respectively, then the calculated difference may be indicative of the second antenna being pointed too directly toward the remote antenna when the second quantity of symbols is greater than a predetermined threshold (e.g., 50%) but less than 100% of the first quantity of symbols. Alternatively, the calculated difference may be indicative of the second antenna being pointed too far away from the remote antenna when the second quantity of symbols is less than a predetermined threshold (e.g., 50%) of the first quantity of symbols. It is further contemplated that the device may adjust the ranges based on a transmission power of the remote antenna.

The device in step 940 may then perform one or more actions based on the currently aimed direction, accordingly. For instance, in one embodiment, the device may determine an adjustment to the currently aimed direction to adjust the currently aimed direction of the first antenna with relation to the remote antenna to a desired aimed direction of the first antenna (e.g., aiming the first antenna directly at the remote antenna, away from being directly toward the remote antenna, or away from one or more other remote antennas while the high gain region of the main lobe of the first antenna is substantially aligned with the remote antenna). The device may then adjust the currently aimed direction of the first antenna with relation to the remote antenna using automated motorized positioning circuitry or by causing instructions to be displayed on a graphical user interface (GUI) that includes guidance according to the currently aimed direction for how to adjust the currently aimed direction of the first antenna with relation to the remote antenna to a desired aimed direction.

Further, as an example of step 945, the device may transmit a signal to the remote antenna using the first antenna in response to confirming that the currently determined aimed (pointing) direction of the first antenna corresponds to a desired aim direction of the first antenna. In another embodiment, the device may prevent a transmission from the first antenna in response to determining that the currently determined aimed direction of the first antenna would cause interference with one or more unintended receivers. In still another embodiment, the device may adjust the currently aimed direction of the first antenna with relation to the remote antenna to a desired aimed direction where power transmitted from the first antenna would adequately reach the remote antenna without being received by one or more unintended receivers, and transmit, in response to confirming that the currently aimed (pointing) direction of the first antenna corresponds to the desired aim direction of the first antenna, a signal to the remote antenna using the first antenna.

As still another example of step 940, the device may use the currently aimed (pointing) direction of the first antenna for geolocation positioning of the first antenna.

The simplified example procedure 900 then ends at step 945.

Figure 10:
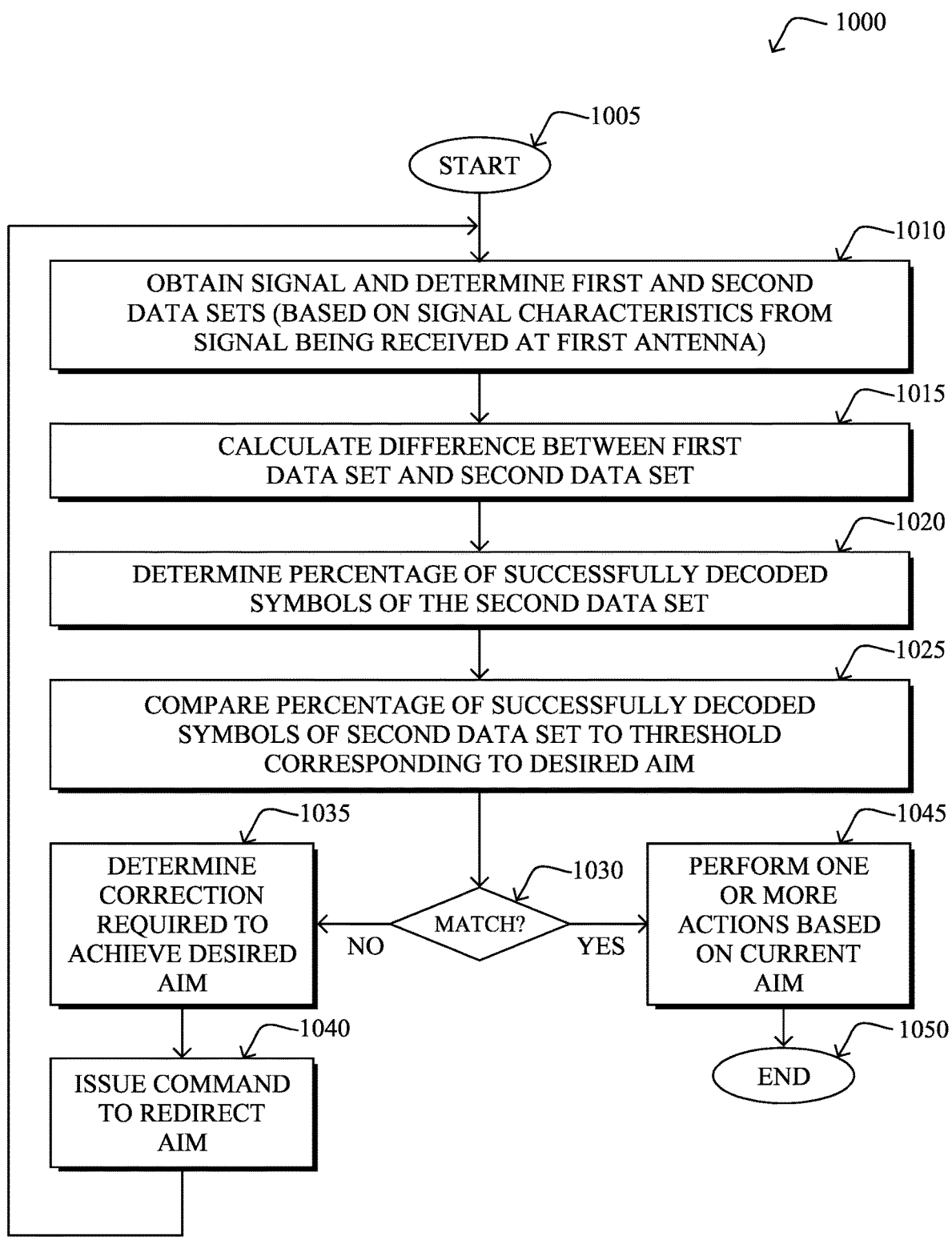
FIG. 10 illustrates another example simplified procedure for precise antenna aiming in accordance with one or more embodiments of the present disclosure, particularly for bringing a currently aimed direction to a desired aimed direction.

FIG. 10 illustrates another example simplified procedure for precise antenna aiming, in accordance with one or more specific embodiments described herein, particularly for bringing a currently aimed direction to a desired aimed direction. For example, procedure 1000 may start at step 1005, and continues to step 1010, where, as described in greater detail above, a device may obtain the signal from the remote antenna (e.g., satellite) to determine the first and second data sets, as described above, i.e., based on signal characteristics from the signal being received at first antenna. The difference between the first data set and the second data set is calculated in step 1015. At step 1020 the device determines the percentage of properly decoded symbols of the second data set as compared to the properly decoded symbols of the first data set (e.g., the difference between the quantity/number of first data symbols and the quantity/number of second data symbols, divided by the quantity of the first data symbols). The percentage is then compared against a predetermined threshold (e.g., 50%) at step 1025, corresponding to the desired aim direction. For instance, the threshold may be based on centering the aim of the first antenna on the remote antenna (e.g., satellite), or aiming slightly away, and so on. (As also explained in greater detail above, the threshold used in step 1025 can be adjusted based on instruction from the interference avoidance module 626 of FIG. 6.) Decision operation 1030 examines the comparison and determines whether the percentage of properly decoded symbols of the second data matches the predetermined threshold. It should be noted that although the description above relates to comparing the difference to a specific number, in one example implementation the comparison may be made to determine whether the difference falls within a predetermined threshold range, such as within the generally central region (e.g., 520*b* above) of the low gain steep curve of the second antenna main lobe, for example, a range between 46%-54%, as opposed to merely 50% exactly. If the operation determines that there is no match (or that the difference does not fall within the predetermined threshold range), then as explained in greater detail in reference to FIG. 6, the procedure continues to step 1035 to determine a correction required to achieve the desired aim direction, and then to step 1040 where the device issues a command to a user or in another example implementation to a motor, to adjust the direction in which the first antenna is pointing to redirect the aim, accordingly. The process then returns to operation/step 1010.

However, if the decision operation 1030 determines that the percentage of properly decoded symbols of the second data set matches the predetermined threshold, the procedure 1000 continues to operation 1045 where the device performs one or more actions based on the determined current aim/direction. Examples of such actions include but are not limited to transmitting data towards the target antenna, utilizing the precise direction towards the satellite for calculating the location of the device, etc.

In one embodiment, prior to the transmission, the device may determine that the first antenna is currently aimed toward the remote antenna in an orientation that prevents interference by the transmission with one or more unintended receivers, or may determine that the high gain region of the main lobe of the first antenna is substantially aimed away from one or more unintended receivers.

The simplified example procedure 1000 then ends at step 1050.

It should be noted that while certain steps within procedures 900-1000 may be optional as described above, the steps shown in FIGS. 9-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may be described separately, certain steps from each procedure may be incorporated into each other procedure, and the procedures are not meant to be mutually exclusive.

Figure 11A:
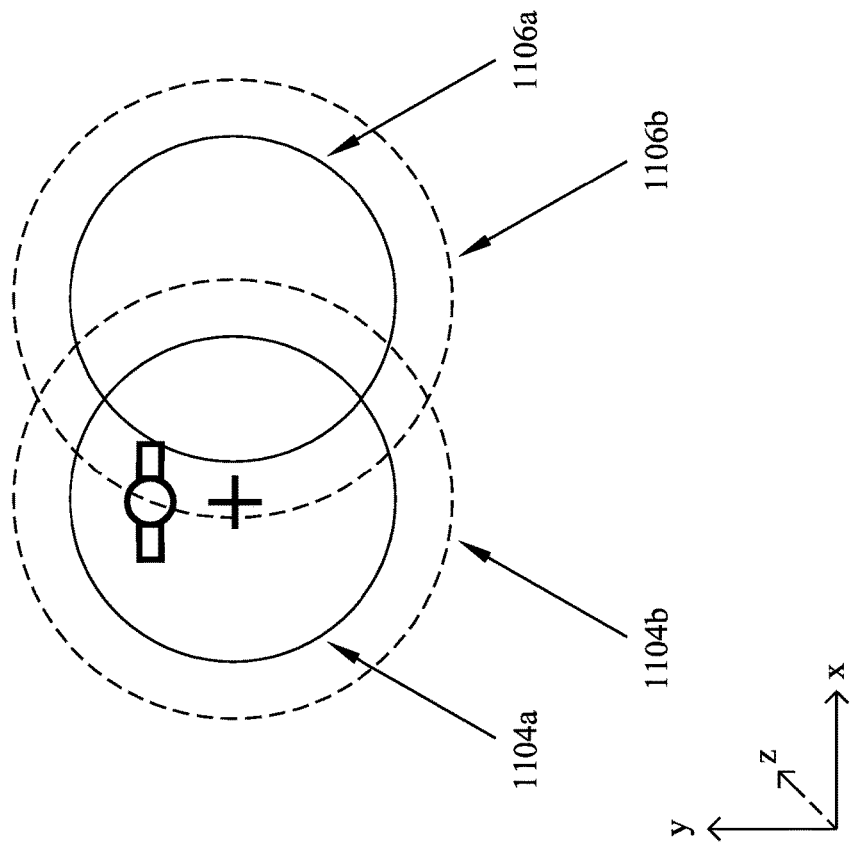
FIGS. 11A-11B illustrate another example for precise antenna aiming in accordance with one or more embodiments of the present disclosure, particularly using three antennas for multi-axis aiming.
Figure 11B:
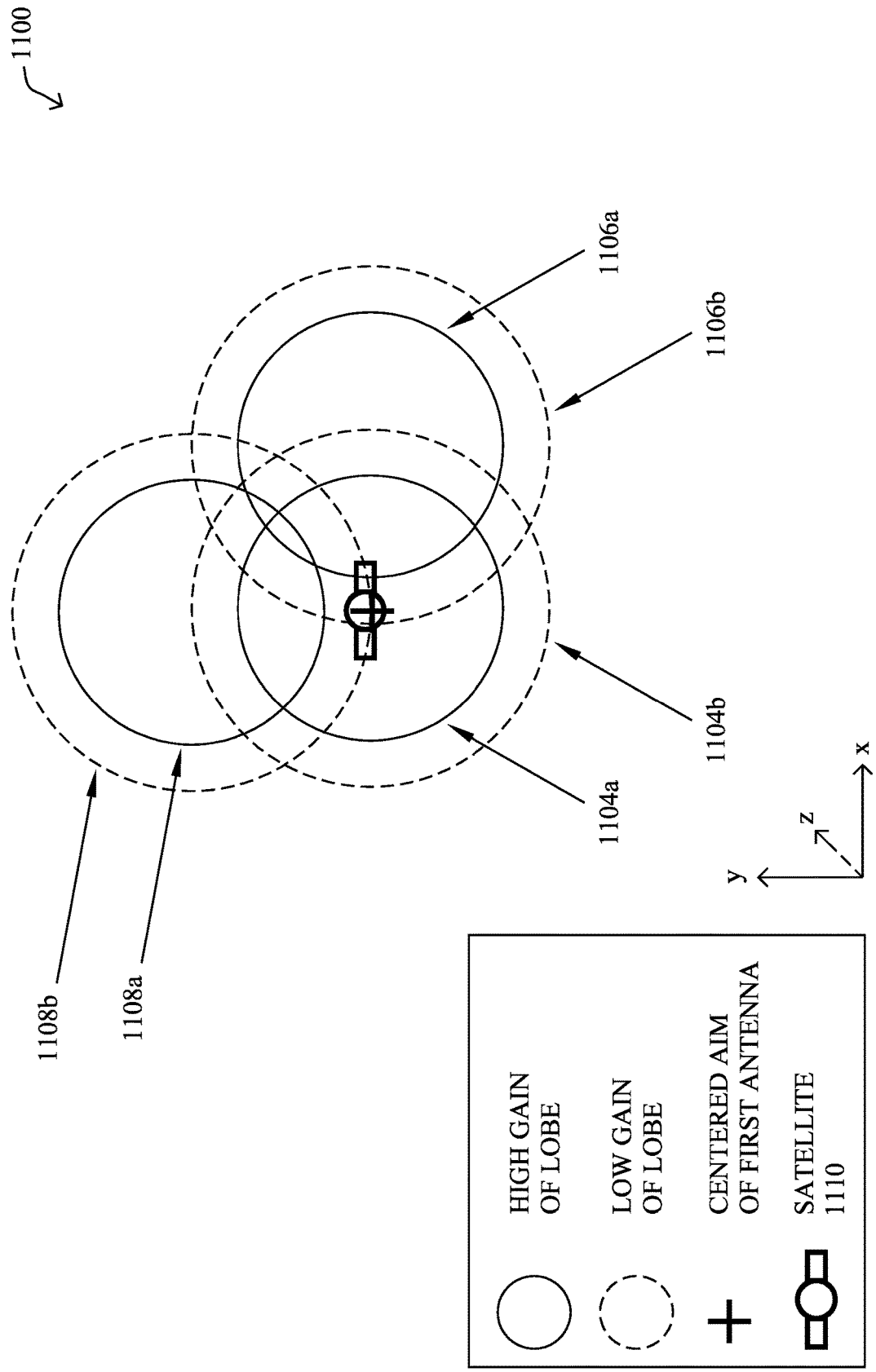

FIGS. 11A-11B illustrate another example 1100 for precise antenna aiming in accordance with one or more embodiments of the present disclosure, particularly using three antennas for multi-axis (e.g., three-dimensional) aiming. For instance, as shown in FIG. 11A, assuming a perspective looking away from the device (away from the first and second antennas) toward the satellite 1110, the view of the main lobes of the antennas result in a generally circular pattern, with the high gain regions of the lobes being a smaller interior circular area surrounded by the outer-most low gain regions/rings.

Specifically, as shown, the main lobe of the first antenna, when centrally aimed at the "+" as shown, results in a high gain region 1104a (from the center to the circle's outer edge) and a low gain region 1104b (from the outer edge of high gain region 1104a to the low gain region ring's outer edge), while the main lobe of the second antenna results in a high gain region 1106a and a low gain region 1106b, accordingly. Where the first antenna and the second antenna are offset from one another by the fixed predetermined angle as described above along a first axis (e.g., the "x" axis), the resultant edge of the low gain region 1106b (the low gain steep curve above) of the second antenna aligns generally with the center of the high gain region 1104a of the first antenna. However, as can be seen, the curvature of the outer edge of the low gain region 1106b of the second antenna may actually result in a variance in positioning from the center aim of the first antenna, particularly in the "y" axis, but also marginally within the "x" axis. That is, there is an arc of the outer edge of the low gain region 1106b of the second antenna along which the satellite 1110 could be positioned while still being within the high gain region 1104a of the first antenna, without the satellite 1110 being in the exact "centered aim" of the first antenna, despite the result of the calculations above generally indicating as such.

In accordance with one or more additional embodiments herein, therefore, a third antenna may be used to add even more precision for the techniques herein, particularly for multi-axis precision aiming. Specifically, and as shown in FIG. 11B, the first antenna and the third antenna may also be collocated and offset along a second axis from one another by a fixed predetermined angle (which may be, though need not be, the same angle as between the first and second antennas), such that the center of the high gain region 1104a of the main lobe of the first antenna is substantially aligned with a low gain region 1108b (particularly, the edge of the low gain region) of a main lobe of the third antenna (which also has a high gain region 1108a). In one embodiment, the first axis and second axis may be generally perpendicular to one another as shown (e.g., the "x" and "y" axis, respectively), and wherein the first axis and second axis are each generally perpendicular to the aimed direction (pointing direction/axis) of the first antenna (e.g., the "z" axis along the line of sight of the centered aim of the first antenna).

For instance, according to the procedures described above, the signal from the remote antenna 1110 may also be received at a third antenna, such that a corresponding third data set (e.g., symbols) can be decoded based on the signal being received at the third antenna using the set of signal characteristics (e.g., phase and timing) as determined based on the signal being received at the first antenna. The device may then calculate a difference between the first data set and the third data set (e.g., percentage of decoded symbols at the third antenna compared to that at the first antenna). Notably, the calculations and circuitry comparing the signal (e.g., the decoded symbols) as received at the first antenna and the third antenna may generally be the same as the calculations and circuitry comparing the signal as received at the first antenna and the second antenna (e.g., with reference to FIGS. 5A-7 above), and for the sake of simplicity is not repeated in detail for the third antenna, specifically.

By using the third antenna configuration in this manner, the device may thus determine the currently aimed direction of the first antenna with relation to the remote antenna based on the difference between the first data set and the second data set (e.g., for a first axis), and further based on the difference between the first data set and the third data set (e.g., for a second axis). In this manner, the precise multi-axis positioning of the aim of the first antenna may be determined and adjusted as noted above. For instance, in one embodiment the current aim may be confirmed to be directly pointed at the satellite 1110 when the signal characteristics (e.g., percentage of decoded symbols) is indicative of being a) within the high gain region 1104a of the first antenna main lobe, b) at the outer edge of the low gain region 1106b of the second antenna main lobe, and c) at the outer edge of the low gain region 1108b of the third antenna main lobe, at the same time. Other desired aims may also be precisely achieved in other embodiments, such as when the desired aim is slightly away from the direction directly towards the satellite 1110 (or some other remote antenna).

Notably, in certain embodiments, the two-antenna configuration may be sufficient for aiming the first antenna as desired (e.g., toward a receiver, away from a receiver, etc.), and may be a suitable tradeoff for processing capability and system cost. In fact, in certain two-antenna embodiments, provisions may be made herein to re-orient the collocated first and second antennas to change their offset axis (e.g., turning a device on its side) to achieve the desired positioning along that new axis. However, the three-antenna configuration provides for more precise multi-axis aiming, as described above, which may be more desired or may be necessary for specifically aiming to avoid one or more unintended receivers, particularly when they are in three dimensional directions, or for more precise geolocation-based positioning according to the direction to the remote satellite, accordingly.

Note further that while the offsets of the second antenna and third antenna are shown as being of the same magnitude and perpendicular to each other, any other offset may be used. Further, while in one example implementation the thresholds of decoded symbols for the two dimensions are the same (e.g., a centered aim), any independently set threshold may be used for the dimensions, whether to account for physical phenomena or to aim the first antenna precisely in each dimension (e.g., more away from a centered aim in one dimension than in another dimension), and as such the thresholds need not be necessarily the same. The views, scales, orientations, and thresholds shown and described herein, therefore, are not meant to be limiting to the scope of the present disclosure.

Figure 12:
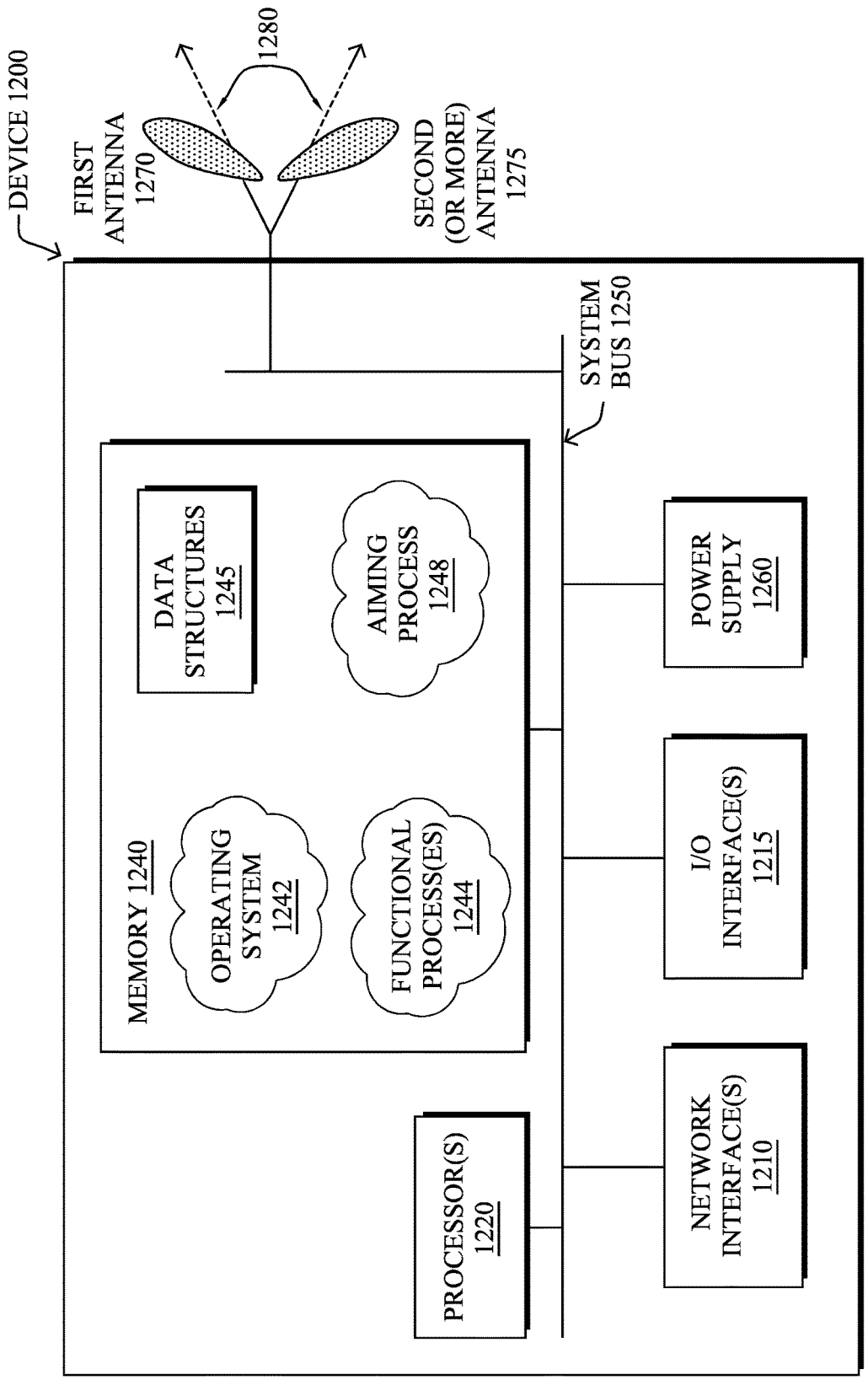
FIG. 12 illustrates a schematic block diagram of an example computing device.

FIG. 12 is a schematic block diagram of an example computing device/node (e.g., an apparatus) 1200 that may be used with one or more embodiments described herein e.g., as any of the devices shown or described herein (e.g., a mobile device, a dispenser, a database, etc.). The device may comprise one or more network interfaces 1210 (e.g., wired, wireless, cellular, etc.), one or more input/output (I/O) interfaces 1215, at least one processor 1220, and a memory 1240 interconnected by a system bus 1250, as well as a power supply 1260 (e.g., battery, plug-in, etc.). Additionally, a first antenna 1270 and second antenna 1275 (and third antenna, as mentioned above) may be in communication with the bus 1250 (e.g., directly, or via network interfaces 1210), where the aim offset 1280 between the antennas is fixed and known, as described in detail above. Note that the antennas 1270 and 1275 are simplified representations of antenna circuitry overall, and actual implementations may include motors, receiver/transmitter circuitry, and so on. As such, the simplified satellites being shown connected to the bus 1250 is merely for the purpose of demonstrating a connection to device 1200, such as receiving and transmitting signals, for commanding motors of the antennas to automatically position the antennas in the desired direction/aim, etc., and is not meant to be limiting to the structural configuration of a device 1200 in accordance with the techniques herein. For example, other connections (e.g., wireless connections, network interface connections, antenna circuitry to convey signals between the satellites and the bus 1250, etc.) may also be included herein.

The network interface(s) 1210 contain the mechanical, electrical, and signaling circuitry for communicating data over links coupled to a computer network. The network interfaces may be configured to transmit and/or receive data using a variety of different communication protocols. Note, further, that the devices may have two or more different types of network connections 1210, for example, wireless and wired/physical connections, and that the view herein is merely for illustration. Further, as noted, the network interface(s) 1210 may include circuitry to communicate with/via the antennas and/or radio components described herein above for wireless communications.

The memory 1240 comprises a plurality of storage locations that are addressable by the processor 1220 and the network interfaces 1210 for storing software programs and data structures associated with the embodiments described herein. The processor 1220 may comprise hardware elements or hardware logic adapted to execute the software programs and manipulate the data structures 1245. An operating system 1242, portions of which are typically resident in memory 1240 and executed by the processor, functionally organizes the device by, among other things, invoking operations in support of software processes and/or services executing on the device. These software processes and/or services may comprise an illustrative antenna aiming process 1248, which may be configured to perform precise antenna aiming as described herein (e.g., a software-based embodiment of the circuitry 600 in FIG. 6 above, or a component of the circuitry 600, etc.).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 13A:
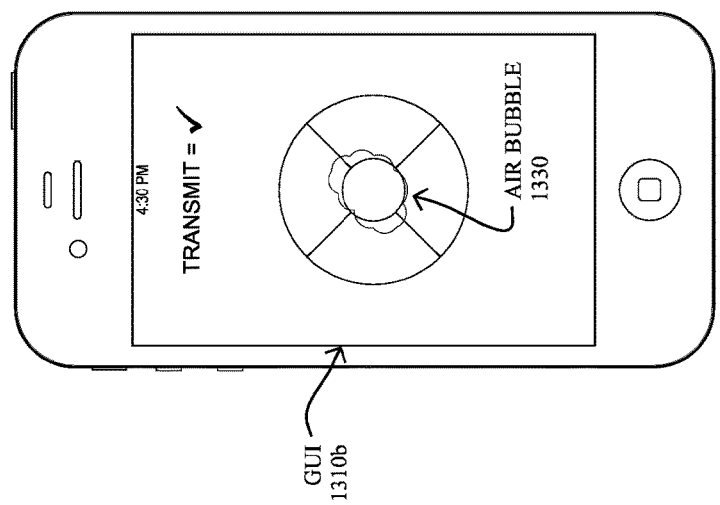
FIGS. 13A-13B illustrate example graphical user interfaces (GUIs) for precise antenna aiming in accordance with one or more embodiments of the present disclosure.
Figure 13B:
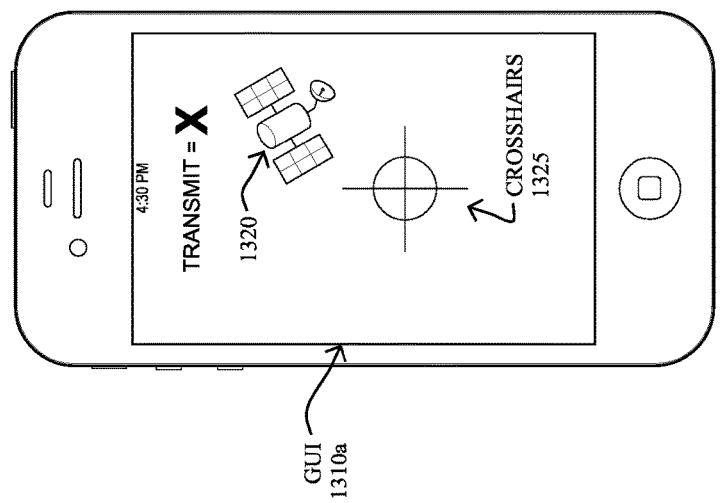

Note also that this aiming process could be manual (i.e., the user directs the antenna) or automatic (e.g., motors, gimbals, etc.), depending on the system need and configuration. FIGS. 13A-13B illustrate examples of a GUI that may be used according to the techniques described above, particularly for user-based control of the directional antenna. In particular, FIG. 13A illustrates a first mobile device 1300a with an example augmented reality (AR) like GUI display 1310a with an AR satellite 1320 and stationary "crosshairs" 1325 to aim at the satellite, thus representing the desired direction to point the mobile device 1300a (whether the satellite is actually located in that direction, or whether that merely represents the desired "aim" of the mobile device to direct the transmission or reception by the first/primary antenna according to the desired aim as described above). As shown, the mobile device is not pointing in the proper direction (i.e., the moving AR satellite 1320 is not within the crosshairs 1325 of the GUI 1310a), and thus the mobile device should not (or in certain instances, cannot) transmit, or may not be able to receive the desired signals from the intended satellite. Alternatively, FIG. 13B illustrates an example mobile device 1300b with an "air bubble" 1330 on GUI display 1310b to guide a user to point the device to the desired angle. As shown in FIG. 13B, the illustrative air bubble 1330 is "level", and as such, the terminal is appropriately aimed, and transmission and/or reception may commence. Many other types of GUIs and functionalities may be conceived, and those shown herein are not meant to be limiting to the scope of the present disclosure.

Notably, in other embodiments, such as where user intervention is not necessary for movement (e.g., automated terminals, drones/UAVs, etc.), the terminals may be re-aimed, repositioned, moved, elevated, etc., based on terminal-directed or server-directed commands according to the desired aim as described herein. That is, no user-based GUI would be necessary to ensure proper adjustment/aim, where sensors and/or controls internal to the terminal would sufficiently and autonomously adjust the orientation of the terminal, and thus the first/primary antenna, accordingly.

Advantageously, the techniques herein thus provide for accurately directing an antenna, such as a satellite antenna, toward a radio source (and thus the intended receiver). In particular, as described above, the techniques herein provide a solution that allows low-power, low-cost, and small-aperture devices to point their transmission antennas precisely towards an intended receiver (e.g., satellite), or alternatively, slightly away from the direction of the target transmitter. That is, the techniques herein may also be used to precisely aim a transmission antenna away from an unintended receiver, such as to avoid interference (e.g., with higher priority receivers) or eavesdropping (e.g., by spy devices), accordingly. Additional uses of precise aim of the first antenna are also provided by the techniques herein, such as being able to precisely determine the direction of a remote transmitter for use in geolocation determination (e.g., triangulation) or otherwise.

While there have been shown and described illustrative embodiments, it is to be understood that various other adaptations and modifications may be made within the scope of the embodiments herein. For example, the embodiments may, in fact, be used in a variety of types of wireless communication networks and/or protocols, and need not be limited to the illustrative satellite network implementation. Furthermore, while the embodiments may have been demonstrated with respect to certain communication environments, physical environments, or device form factors, other configurations may be conceived by those skilled in the art that would remain within the contemplated subject matter of the description above.

Furthermore, in the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

In particular, the foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    receiving, by a device, a signal from a remote antenna at both a first antenna and a second antenna, the first antenna and the second antenna being collocated and offset from one another by a fixed predetermined angle such that a center of a high gain region of a main lobe of the first antenna is substantially aligned with a low gain region of a main lobe of the second antenna;
    determining, by the device, a set of signal characteristics of the signal based on the signal being received at the first antenna;
    decoding, by the device, a first data set based on the signal being received at the first antenna using the set of signal characteristics;
    decoding, by the device, a second data set based on the signal being received at the second antenna using the set of signal characteristics;
    calculating, by the device, a difference between the first data set and the second data set; and
    determining, by the device, a currently aimed direction of the first antenna with relation to the remote antenna based on the difference between the first data set and the second data set.

2. The method as in claim 1, further comprising:
    confirming that the currently aimed direction of the first antenna is pointing directly at the remote antenna when the difference between the first data set and the second data set is within a range indicative of the signal being received within the center of the high gain region of the main lobe of the first antenna while also being received within a center of the low gain region of the main lobe of the second antenna.

3. The method as in claim 2, further comprising:
    adjusting the range based on a transmission power of the remote antenna.

4. The method as in claim 1, wherein the first data set and second data set comprise decoded symbols.

5. The method as in claim 1, wherein the set of characteristics of the signal comprise one or both of timing parameters and phase parameters.

6. The method as in claim 1, wherein a received signal strength indicator (RSSI) of the signal from the remote antenna received at the high gain region of the main lobe of the first antenna remains substantially the same throughout a range of directions that correspond to the signal from the remote antenna being received within the low gain region of the main lobe of the second antenna.

7. The method as in claim 1, further comprising:
    determining that the calculated difference is indicative of the low gain region of the main lobe of the second antenna being pointed too directly toward the remote antenna.

8. The method as in claim 7, wherein the first data set and the second data set comprise a first quantity of symbols and a second quantity of symbols, respectively, and wherein the calculated difference is indicative of the second quantity of symbols being greater than predetermined threshold but less than 100% of the first quantity of symbols.

9. The method as in claim 1, further comprising:
    determining that the calculated difference is indicative of the low gain region of the main lobe of the second antenna being pointed too far away from the remote antenna.

10. The method as in claim 9, wherein the first data set and the second data set comprise a first quantity of symbols and a second quantity of symbols, respectively, and wherein the calculated difference is indicative of the second quantity of symbols being less than a predetermined threshold of the first quantity of symbols.

11. The method as in claim 1, further comprising:
    determining an adjustment to the currently aimed direction to adjust the currently aimed direction of the first antenna with relation to the remote antenna to a desired aimed direction of the first antenna.

12. The method as in claim 11, wherein the desired aimed direction of the first antenna aims the first antenna directly at the remote antenna.

13. The method as in claim 11, wherein the desired aimed direction of the first antenna aims the first antenna away from being directly toward the remote antenna.

14. The method as in claim 11, wherein the desired aimed direction of the first antenna aims the first antenna away from one or more other remote antennas while the high gain region of the main lobe of the first antenna is substantially aligned with the remote antenna.

15. The method as in claim 1, further comprising:
    adjusting the currently aimed direction of the first antenna with relation to the remote antenna using automated motorized positioning circuitry to a desired aimed direction.

16. The method as in claim 1, further comprising:
    causing instructions to be displayed on a graphical user interface (GUI) that includes guidance according to the currently aimed direction for how to adjust the currently aimed direction of the first antenna with relation to the remote antenna to a desired aimed direction.

17. The method as in claim 1, further comprising:
transmitting, in response to confirming that the currently aimed direction of the first antenna corresponds to a desired aim direction of the first antenna, a signal to the remote antenna using the first antenna.

18. The method as in claim 1, further comprising:
preventing a transmission from the first antenna in response to determining that the currently aimed direction of the first antenna would cause interference with one or more unintended receivers.

19. The method as in claim 1, further comprising:
adjusting the currently aimed direction of the first antenna with relation to the remote antenna to a desired aim direction where power transmitted from the first antenna would adequately reach the remote antenna without being received by one or more unintended receivers; and
transmitting, in response to confirming that the currently aimed direction of the first antenna corresponds to the desired aim direction of the first antenna, a signal to the remote antenna using the first antenna.

20. The method as in claim 1, further comprising:
using the currently aimed direction of the first antenna for geolocation positioning of the first antenna.

21. The method as in claim 1, wherein the device, first antenna, and second antenna are in a relationship selected from a group consisting of: the device comprising the first antenna and the second antenna; the device being collocated with the first antenna and the second antenna; and the device being remote from the first antenna and the second antenna.

22. The method as in claim 1, wherein the remote antenna is a satellite.

23. The method as in claim 1, wherein the first antenna and the second antenna are offset from one another by a fixed predetermined angle along a first axis, the method further comprising:
receiving the signal from the remote antenna at a third antenna, the first antenna and the third antenna being collocated and offset from one another by a fixed predetermined angle along a second axis such that the center of the high gain region of the main lobe of the first antenna is substantially aligned with a low gain region of a main lobe of the third antenna;
decoding a third data set based on the signal being received at the third antenna using the set of signal characteristics;
calculating a difference between the first data set and the third data set; and
determining the currently aimed direction of the first antenna with relation to the remote antenna based on the difference between the first data set and the second data set and based on the difference between the first data set and the third data set.

24. The method as in claim 23, wherein the first axis and second axis are generally perpendicular to one another, and wherein the first axis and second axis are each generally perpendicular to a pointing direction of the first antenna.

25. A tangible, non-transitory, computer-readable medium storing program instructions that cause a computer to execute a process comprising:
receiving a signal from a remote antenna at both a first antenna and a second antenna, the first antenna and the second antenna being collocated and offset from one another by a fixed predetermined angle such that a center of a high gain region of a main lobe of the first antenna is substantially aligned with a low gain region of a main lobe of the second antenna;
determining a set of signal characteristics of the signal based on the signal being received at the first antenna;
decoding a first data set based on the signal being received at the first antenna using the set of signal characteristics;
decoding a second data set based on the signal being received at the second antenna using the set of signal characteristics;
calculating a difference between the first data set and the second data set; and
determining a currently aimed direction of the first antenna with relation to the remote antenna based on the difference between the first data set and the second data set.

26. An apparatus, comprising:
a processor configured to execute one or more processes; and
a memory configured to store a process executable by the processor, the process when executed configured to:
receive a signal from a remote antenna at both a first antenna and a second antenna, the first antenna and the second antenna being collocated and offset from one another by a fixed predetermined angle such that a center of a high gain region of a main lobe of the first antenna is substantially aligned with a low gain region of a main lobe of the second antenna;
determine a set of signal characteristics of the signal based on the signal being received at the first antenna;
decode a first data set based on the signal being received at the first antenna using the set of signal characteristics;
decode a second data set based on the signal being received at the second antenna using the set of signal characteristics;
calculate a difference between the first data set and the second data set; and
determine a currently aimed direction of the first antenna with relation to the remote antenna based on the difference between the first data set and the second data set.

* * * * *